United States Patent
Yokoi et al.

(10) Patent No.: US 8,346,780 B2
(45) Date of Patent: Jan. 1, 2013

(54) INTEGRATED SEARCH SERVER AND INTEGRATED SEARCH METHOD

(75) Inventors: Kazuhito Yokoi, Yokohama (JP); Yohsuke Ishii, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 226 days.

(21) Appl. No.: 12/740,550

(22) PCT Filed: Apr. 16, 2010

(86) PCT No.: PCT/JP2010/002775
§ 371 (c)(1),
(2), (4) Date: Apr. 29, 2010

(87) PCT Pub. No.: WO2011/128945
PCT Pub. Date: Oct. 20, 2011

(65) Prior Publication Data
US 2012/0047168 A1 Feb. 23, 2012

(51) Int. Cl.
*G06F 17/00* (2006.01)
(52) U.S. Cl. ........ 707/748; 707/706; 707/708; 707/713; 707/755; 707/732

(58) Field of Classification Search ............... 707/706, 707/708, 713, 727, 732, 748, 754, 755
See application file for complete search history.

(56) References Cited

U.S. PATENT DOCUMENTS

| | | | |
|---|---|---|---|
| 6,205,456 B1 * | 3/2001 | Nakao | 715/201 |
| 2002/0161753 A1 | 10/2002 | Inaba et al. | |
| 2003/0220913 A1 | 11/2003 | Doganata et al. | |
| 2011/0004829 A1 * | 1/2011 | Olsen | 715/745 |

* cited by examiner

*Primary Examiner* — Sana Al Hashemi
(74) *Attorney, Agent, or Firm* — Volpe and Koenig, P.C.

(57) ABSTRACT

In order to mitigate a load in communications among an integrated search server, a plurality of search users and a plurality of search servers in an integrated search system, in the present invention, when an integrated search is executed, first, information for narrowing down the search servers is obtained from each search server, and subsequently, the search servers are narrowed down based on this information, and search results are obtained from only the search servers which have been narrowed down. Thereby, there are advantageous effects of reducing memory usage of the integrated search server, and reducing unnecessary network traffic between the integrated search server and each search server.

9 Claims, 25 Drawing Sheets

FIG. 7

| TRANSMITTING SEARCH SERVER | THE NUMBER OF SEARCH RESULTS |
|---|---|
| SEARCH SERVER A | 5 |
| SEARCH SERVER B | 6 |
| SEARCH SERVER C | 4 |
| SEARCH SERVER D | 4 |
| SEARCH SERVER E | 0 |

| TRANSMITTING SEARCH SERVER | MAXIMUM SCORE VALUE | MINIMUM SCORE VALUE | THE NUMBER OF SEARCH RESULTS |
|---|---|---|---|
| SEARCH SERVER A | 250 | 170 | 5 |
| SEARCH SERVER B | 200 | 100 | 6 |
| SEARCH SERVER C | 130 | 50 | 4 |
| SEARCH SERVER D | 80 | 30 | 4 |
| SEARCH SERVER E | 0 | 0 | 0 |

FIG. 1 1

| TRANSMITTING SEARCH SERVER | MAXIMUM SCORE VALUE | MINIMUM SCORE VALUE | THE NUMBER OF SEARCH RESULTS |
|---|---|---|---|
| SEARCH SERVER A | 250 | 170 | 5 |
| SEARCH SERVER B | 200 | 100 | 6 |

FIG. 14

| TRANSMITTING SEARCH SERVER | SCORE | THE NUMBER OF DIGEST INFORMATION TARGET SCORES | THE NUMBER OF SEARCH RESULTS |
|---|---|---|---|
| SEARCH SERVER A | 250 | 5 | 5 |
| SEARCH SERVER A | 230 | 5 | 5 |
| SEARCH SERVER A | 210 | 5 | 5 |
| SEARCH SERVER B | 200 | 6 | 6 |
| SEARCH SERVER A | 190 | 5 | 5 |
| SEARCH SERVER B | 180 | 6 | 6 |
| SEARCH SERVER A | 170 | 5 | 5 |
| SEARCH SERVER B | 160 | 6 | 6 |
| SEARCH SERVER B | 140 | 6 | 6 |
| SEARCH SERVER C | 130 | 4 | 4 |
| SEARCH SERVER B | 120 | 6 | 6 |
| SEARCH SERVER C | 110 | 4 | 4 |
| SEARCH SERVER B | 100 | 6 | 6 |
| SEARCH SERVER C | 90 | 4 | 4 |
| SEARCH SERVER C | 70 | 4 | 4 |
| SEARCH SERVER D | 80 | 4 | 4 |
| SEARCH SERVER D | 60 | 4 | 4 |
| SEARCH SERVER D | 40 | 4 | 4 |
| SEARCH SERVER D | 30 | 4 | 4 |
| SEARCH SERVER E | NULL | 0 | 0 |

FIG. 2 0

| TRANSMITTING SEARCH SERVER | ACCESS RIGHT |
|---|---|
| SEARCH SERVER A | YES |
| SEARCH SERVER B | YES |
| SEARCH SERVER C | NO |

FIG. 2 6

| TRANSMITTING SEARCH SERVER | USED LANGUAGE | REGISTRATION DATE AND TIME |
|---|---|---|
| SEARCH SERVER A | ENGLISH, JAPANESE | 2009/12/01 03:00 |
| SEARCH SERVER B | ENGLISH | 2010/01/03 01:00 |
| SEARCH SERVER C | JAPANESE | 2010/01/07 01:00 |

FIG. 2 7

| TRANSMITTING SEARCH SERVER | CACHE DESTINATION-INTEGRATED SEARCH SERVER |
|---|---|
| SEARCH SERVER A | IDENTIFICATION INFORMATION ON INTEGRATED SEARCH SERVER |
| SEARCH SERVER B | IDENTIFICATION INFORMATION ON INTEGRATED SEARCH SERVER |

INTEGRATED SEARCH SERVER AND INTEGRATED SEARCH METHOD

TECHNICAL FIELD

The present invention relates to an integrated search server and an integrated search method, and for example, relates to a technique for obtaining search results from a plurality of search servers and providing an integrated search result to a search client.

BACKGROUND ART

In an integrated search system, an integrated search server issues a cross search request to a plurality of search servers, and outputs an integrated search result in which search results obtained from the respective search servers have been integrated. Since the integrated search system uses the plurality of search servers, a simple cross search request and a simple process for integrating the search results may cause inconvenience. In order to solve this inconvenience, a method of exchanging information other than the search request and the search results between the integrated search server and the search servers, and realizing an optimal integrated search system is required.

For example, a score of a document in the search result which has been calculated by each search server may change depending on contents of an index included in the search server. In this case, since respective documents in the integrated search result in which the search results obtained from the respective search servers have been integrated have the scores calculated from different perspectives, a sequence of the documents in order of score in the integrated search result is not appropriate. In order to overcome this problem, there is an approach in which the integrated search server exchanges statistical information for scoring, with each search server, and thereby, a score value after the integration is calculated in each search server (for example, see Patent Literature 1). In this approach, first, when the integrated search server issues the search request to each search server, each search server transmits statistical information which has been created based on an intermediate result obtained by a search operation, to the integrated search server. Next, the integrated search server aggregates each statistical information, creates global statistical information, and transmits the global statistical information to each search server. Lastly, each search server calculates the score based on the global statistical information, and transmits the search result to the integrated search server. According to this approach, optimal scoring can be performed for the entire integrated search system.

CITATION LIST

Patent Literature
   PTL 1: US Patent Publication No. US 2002/0161753

SUMMARY OF INVENTION

Technical Problem

However, in the integrated search system described in Patent Literature 1, a load caused in the integrated search server tends to increase along with scale expansion of the system. In other words, the integrated search server obtains the search results from all the search servers which are search targets, and creates the integrated search result in which the respective search results have been integrated. In this way, in the above described process, since the search results are obtained from all the search servers, a large amount of memory on the integrated search server is used for temporarily saving the respective search results. Moreover, many network bands are used for transferring all the search results between the integrated search server and the respective search servers. Particularly, the integrated search server is a component on which the load is likely to be concentrated, among components on the integrated search system. This is because the integrated search server accepts integrated search requests from a plurality of search clients, and obtains the search results from the plurality of search servers for one integrated search. In a large-scale integrated search system, a mechanism for reducing the load on the integrated search server is required in which these problems have been solved.

The present invention has been made in view of the above situation, and provides a technique for reducing the load on the integrated search server, which is associated with the scale expansion of the integrated search system.

Solution to Problem

In order to solve the above problems, in the present invention, when an integrated search is executed, an integrated search server receives digest information, instead of search results, from search servers which are search targets. This digest information is information regarding the search results or the search servers, for narrowing down search servers from which the search results are obtained. When the integrated search server obtains the digest information from all the search servers, the integrated search server narrows the search servers down to search servers having search results required for creating an integrated search result, based on the digest information. Subsequently, the search results are obtained from only the search servers which have been narrowed down, and the integrated search result is created.

The digest information is configured to have any of the number of search results (Method 1), maximum and minimum score values (Method 2), score value ranking (Method 3), a used language in an index in each search server (Method 4), and an access right of a client PC (Method 5), or to have a possible combination thereof.

Moreover, past digest information may be cached in the integrated search server, and may be used for next and subsequent integrated searches. However, if an index creation process (index update process) has been executed for a file server by the search server, the digest information may change, and thus, the cached past digest information is deleted.

Further characteristics of the present invention will be apparent from the following embodiments for carrying out the present invention and the accompanying drawings.

ADVANTAGEOUS EFFECTS OF INVENTION

According to the present invention, the load on the integrated search server, which is associated with the scale expansion of the integrated search system, can be reduced.

BRIEF DESCRIPTION OF DRAWINGS

FIG. 7 is a diagram showing a digest information table in Method 1.

FIG. 11 is a temporarily-saved digest information table in Method 2.

FIG. 13 is a diagram showing the contents (example) of the search results obtained according to Method 2.

FIG. 14 is a diagram showing the digest information table in Method 3.

FIG. 20 is a diagram showing the digest information table in Method 5.

FIG. 22 is a diagram showing the internal configuration of the integrated search server according to a second embodiment.

FIG. 24 is a diagram showing the internal configuration of the file server according to the second embodiment.

FIG. 26 is a used language cache management table for illustrating a digest information cache management table according to the second embodiment.

FIG. 27 is a diagram showing a cache destination management table according to the second embodiment.

DESCRIPTION OF EMBODIMENTS

Figure 1:
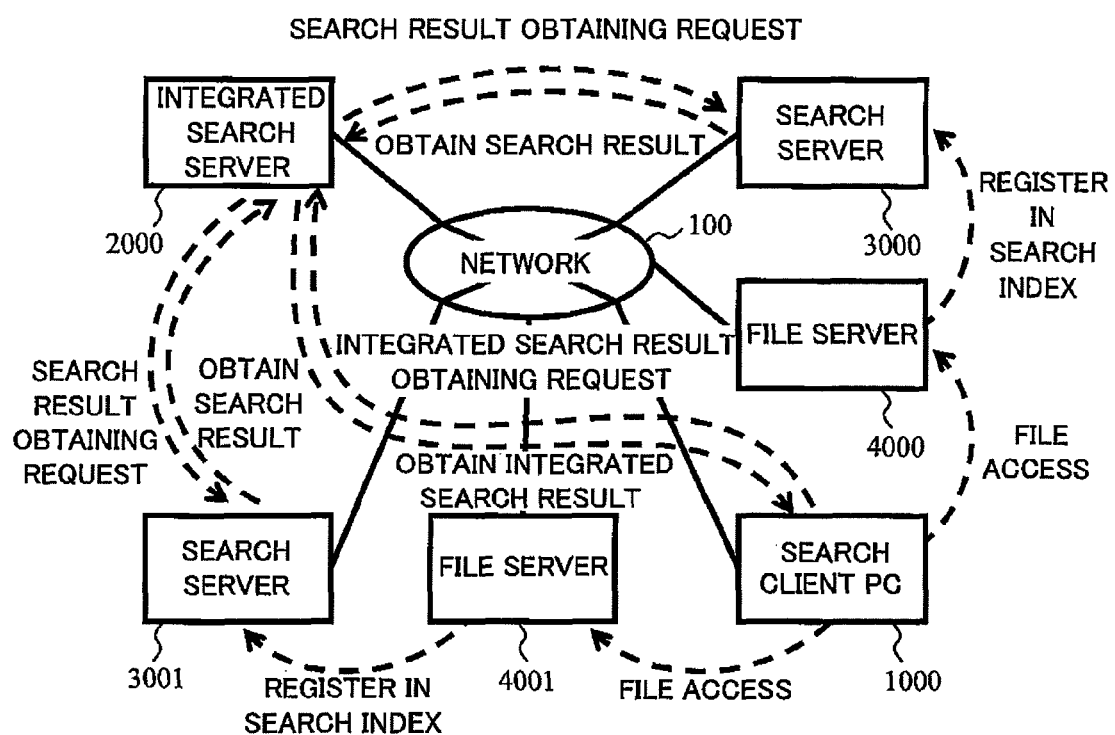
FIG. 1 is a diagram showing a schematic configuration of an integrated search system.

The present invention relates to a search technique in which an integrated search server obtains digest information which is related to search results from search servers, and which is used for narrowing down the search servers from which the search results are actually obtained, from a plurality of the search servers, and obtains the search results from only the search servers which have been narrowed down by using this digest information, and thereby, reduction in memory usage of the integrated search server and reduction in unnecessary network traffic are realized.

Hereinafter, embodiments of the present invention will be described with reference to the accompanying drawings. However, it should be noted that these embodiments are merely an example for realizing the present invention, and do not limit the technical scope of the present invention. Moreover, the same reference numeral is assigned to a common configuration in each figure.

(1) First Embodiment

<Configuration of Integrated Search System>

FIG. 1 is a diagram showing a schematic configuration of an integrated search system applied to each embodiment of the present invention. The integrated search system is configured to include an integrated search server 2000, a plurality of search servers 3000 to 3001, a plurality of file servers 4000 to 4001 (for example, paired with the search servers), and at least one search client PC 1000. These components connect to a network 100 such as an intranet or the Internet so that the components can communicate with one another.

The file server 4000 provides a service for sharing a file via the network 100, for the search servers 3000 and 3001, the search client PC 1000 and the like.

The search server 3000 provides a service for searching for a shared file in the file server 4000. In order to provide this service, the search server 3000 registers contents of the shared file which are periodically obtained from the file server 4000, in a search index. After this process, when the search server 3000 receives a search result obtaining request from the integrated search server 2000 or the search client PC 1000, the search server 3000 uses a search keyword included in the search result obtaining request, to perform a search in the search index (not shown), and transmits a result of the search to a transmitter of the search result request.

The integrated search server 2000 provides a service for performing a cross search in the plurality of search servers 3000 and 3001 and the like, and outputting an integrated search result in which the search results obtained from the respective search servers 3000 to 3001 have been integrated. When the integrated search server 2000 receives an integrated search result obtaining request, the integrated search server 2000 transmits the search result obtaining request including a search keyword included in the integrated search result obtaining request, to the search servers 3000 to 3001 which are search targets. When the integrated search server 2000 obtains the search results corresponding to the search result obtaining request, from the respective search servers 3000 and 3001, the integrated search server 2000 creates the integrated search result in which the search results have been integrated, and transmits the integrated search result to the search client PC 1000 which is a transmitter of the integrated search result obtaining request.

The search client PC 1000 provides a function of a client for the integrated search server 2000, the search servers 3000 to 3001, and the file servers 4000 to 4001. It should be noted that the four components are described as respective independent apparatuses in FIG. 1, which, however, is not limited thereto. For example, the search server 3000 and the integrated search server 2000 may be realized in a single apparatus, or the search server 3000 and the file server 4000 may be realized in a single apparatus. Of course, the integrated search server, the search server, the file server and the search client PC may be realized as a single apparatus.

<Internal Configuration of Search Client>

Figure 2:
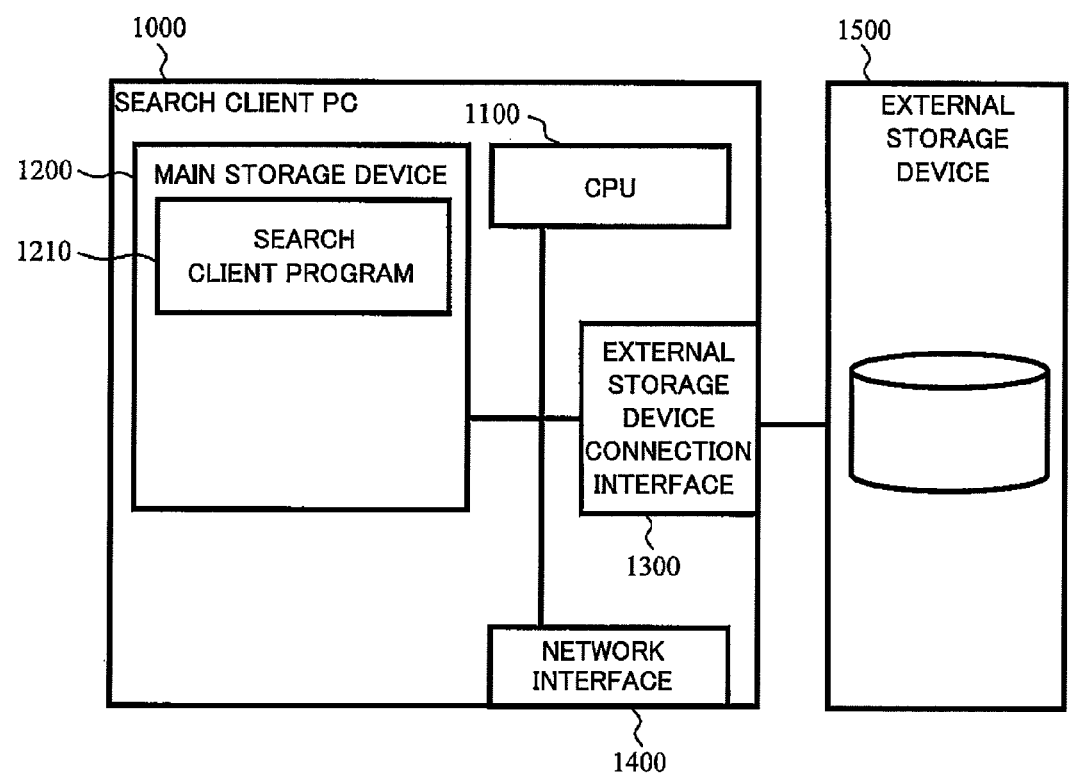
FIG. 2 is a diagram showing an internal configuration of a search client PC.

FIG. 2 is a diagram showing an internal configuration of the search client PC 1000. The search client PC 1000 includes a CPU 1100, a main storage device (main memory) 1200, an external storage device connection interface 1300, and a network interface 1400 therein, and respective components are connected via an internal bus.

The external storage device connection interface 1300 is connected to an external storage device 1500, and the network interface 1400 is connected to the network 100. The search client PC 1000 can communicate with the integrated search server 2000 and the like via the network interface 1400.

The main storage device 1200 corresponds to a real memory, in which a search client program 1210 is stored. The search client program 1210 has a function of accepting an input of a search keyword from a user, and a function of transmitting the accepted search keyword as the integrated search result obtaining request to the integrated search server 2000 and obtaining the integrated search result. The functions of the program may be modularized.

<Internal Configuration of Integrated Search Server>

Figure 3:
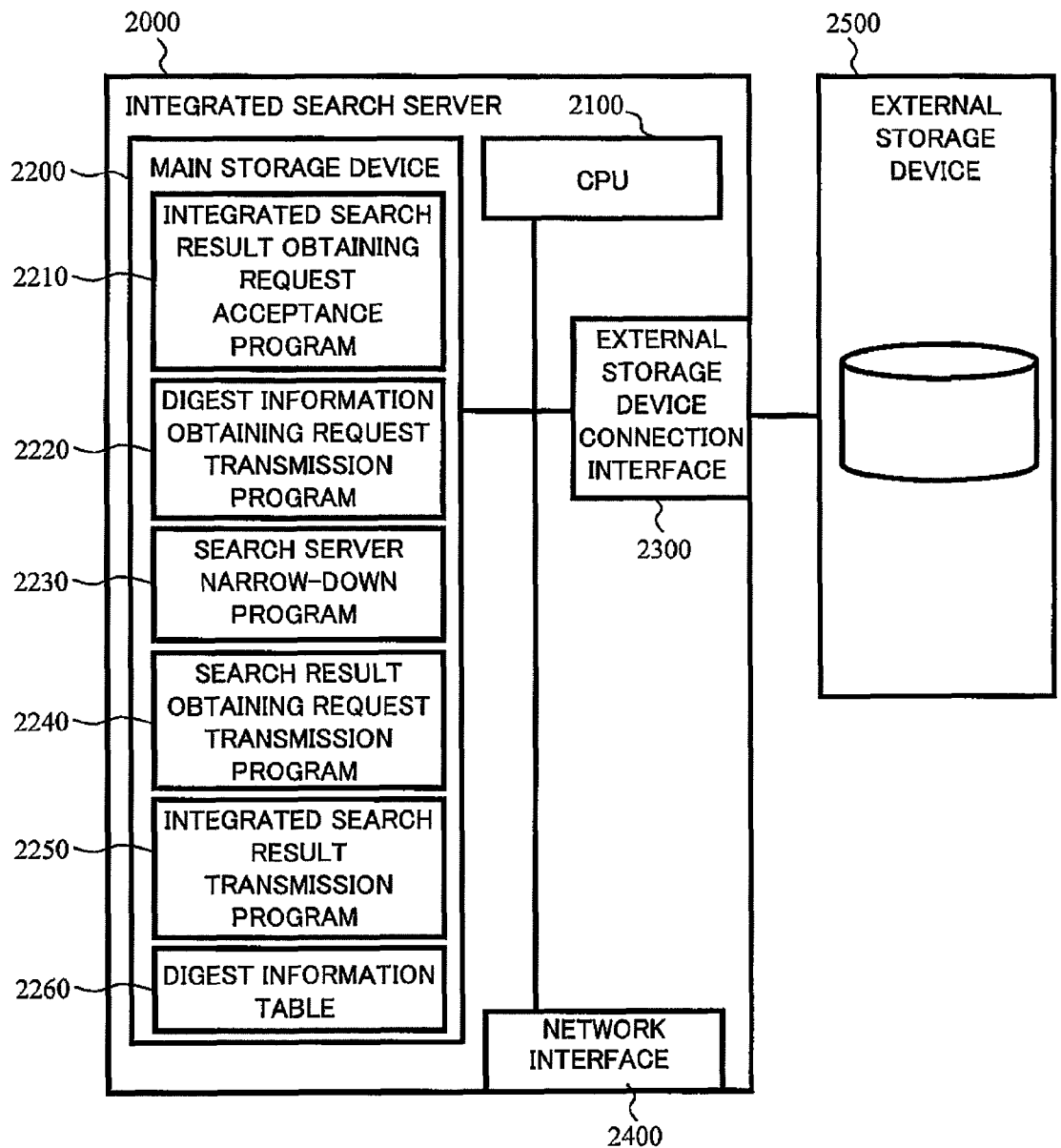
FIG. 3 is a diagram showing an internal configuration of an integrated search server according to a first embodiment.

FIG. 3 is a diagram showing an internal configuration of the integrated search server 2000. The integrated search server 2000 includes a CPU 2100, a main storage device 2200, an external storage device connection interface 2300, and a network interface 2400 therein, and respective components are connected via an internal bus. The external storage device connection interface 2300 is connected to an external storage device 2500, and the network interface 2400 is connected to the network 100. The integrated search server 2000 can communicate with the search client PC 1000, the search server 3000 and the like via the network interface 2400.

The main storage device 2200 corresponds to a real memory, in which an integrated search result obtaining request acceptance program 2210, a digest information obtaining request transmission program 2220, a search server narrow-down program 2230, a search result obtaining request transmission program 2240, an integrated search result transmission program 2250, and a digest information table 2260 are stored.

The integrated search result obtaining request acceptance program 2210 has a function of receiving the integrated search result obtaining request from the search client PC 1000. The digest information obtaining request transmission program 2220 has a function of transmitting a digest information obtaining request including the search keyword in the integrated search result obtaining request and a type of requested digest information, to each search server 3000. The search server narrow-down program 2230 has a function of narrowing the search servers down to only the search servers 3000 having search results required for creating the integrated search result, based on the digest information received from each search server 3000. The search result obtaining request transmission program 2240 has a function of transmitting the search result obtaining request to each search server 3000. The integrated search result transmission program 2250 has a function of integrating the search results obtained from each search server 3000, and transmitting the integrated search result to the search client PC 1000. The digest information table 2260 is a management table for temporarily storing the digest information obtained from the search server 3000. The functions of the respective programs may be modularized.

<Internal Configuration of Search Server>

Figure 4:
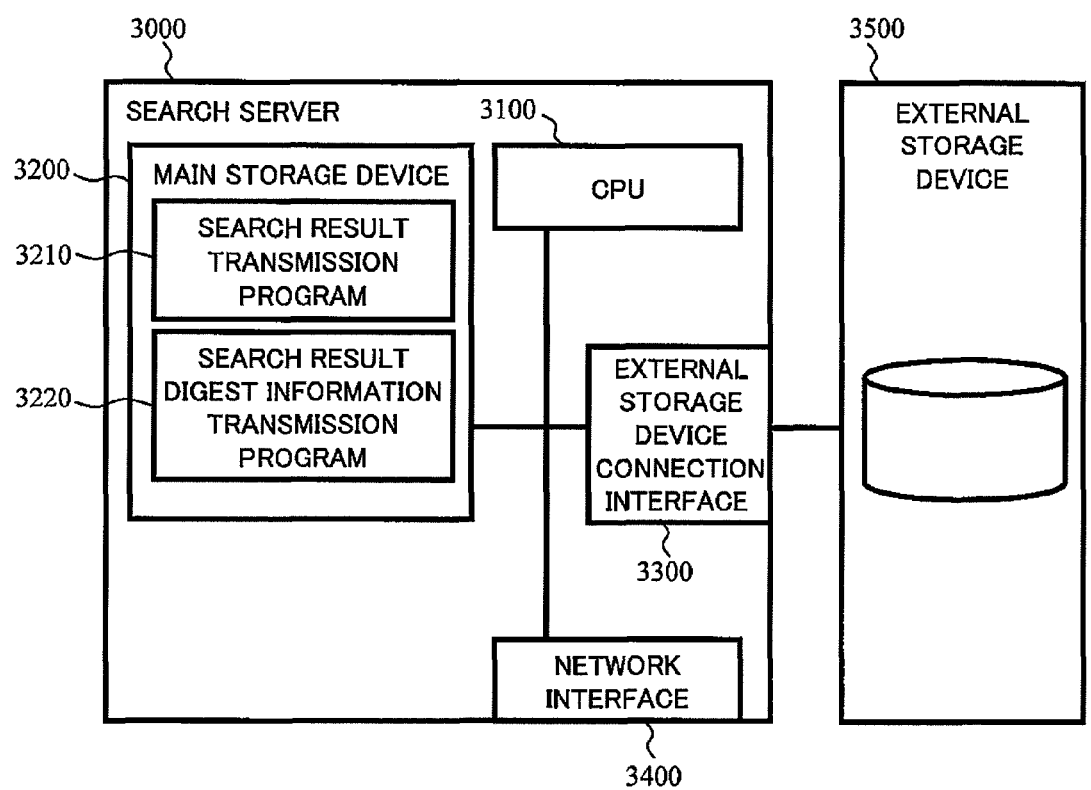
FIG. 4 is a diagram showing an internal configuration of a search server according to the first embodiment.

FIG. 4 is a diagram showing an internal configuration of the search server 3000. The search server 3000 includes a CPU 3100, a main storage device 3200, an external storage device connection interface 3300, and a network interface 3400 therein, and respective components are connected via an internal bus.

The external storage device connection interface 3300 is connected to an external storage device 3500. The external storage device 3500 stores the search index created by performing indexing of contents of each file (an index creation process), and the like, in order to search for the files on the file server 4000.

The network interface 3400 is connected to the network 100. The search server 3000 communicates with the integrated search server 2000, the file server 4000 and the like via the network interface 3400.

The main storage device 3200 corresponds to a real memory, in which a digest information transmission program 3210 and a search result transmission program 3220, as well as cache data of the search index to be stored in the external storage device 3500 are stored. When the search result digest information transmission program 3210 receives the digest information obtaining request, the search result digest information transmission program 3210 transmits the digest information designated in the digest information obtaining request, to a transmitter of the digest information obtaining request. The search result transmission program 3220 has a function of, when the search result obtaining request is received, using the search keyword in the search result obtaining request, to perform the search in the search index, and transmitting the search result to a transmitter of the search result obtaining request. The functions of the respective programs may be modularized.

<Internal Configuration of File Server>

Figure 5:
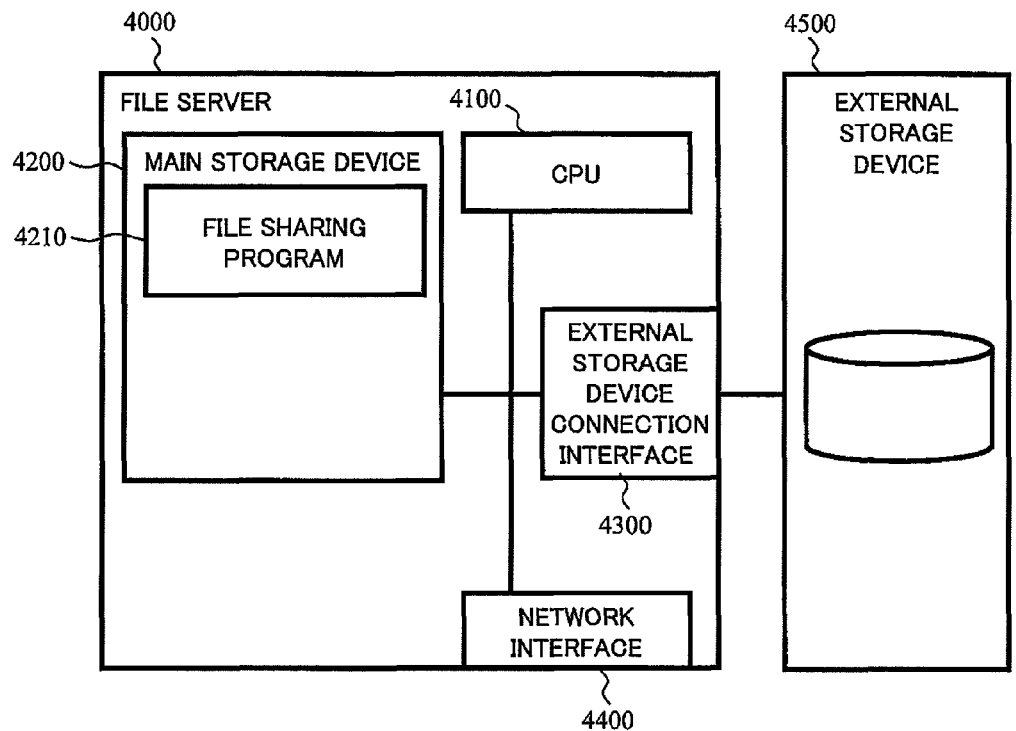
FIG. 5 is a diagram showing an internal configuration of a file server according to the first embodiment.

FIG. 5 is a diagram showing an internal configuration of the file server 4000. The file server 4000 includes a CPU 4100, a main storage device 4200, an external storage device connection interface 4300, and a network interface 4400 therein, and respective components are connected via an internal bus.

The external storage device connection interface 4300 is connected to an external storage device 4500, and the network interface 4400 is connected to the network 100. The file server 4000 communicates with the search server 3000 and the like via the network interface 4400.

The main storage device 4200 corresponds to a real memory, in which a file sharing program 4210 is stored. The file sharing program 4210 has a function of sharing a file with another apparatus (the search server or the search client) via the network interface 4400. This file sharing program 4210 saves the file in the external storage device 4500 of the file server 4000, and presents a target file to the client PC 1000 in response to a file obtaining request from the client PC 1000. The function of the program may be modularized.

<Outline of Operations of Integrated Search System>

Figure 6:
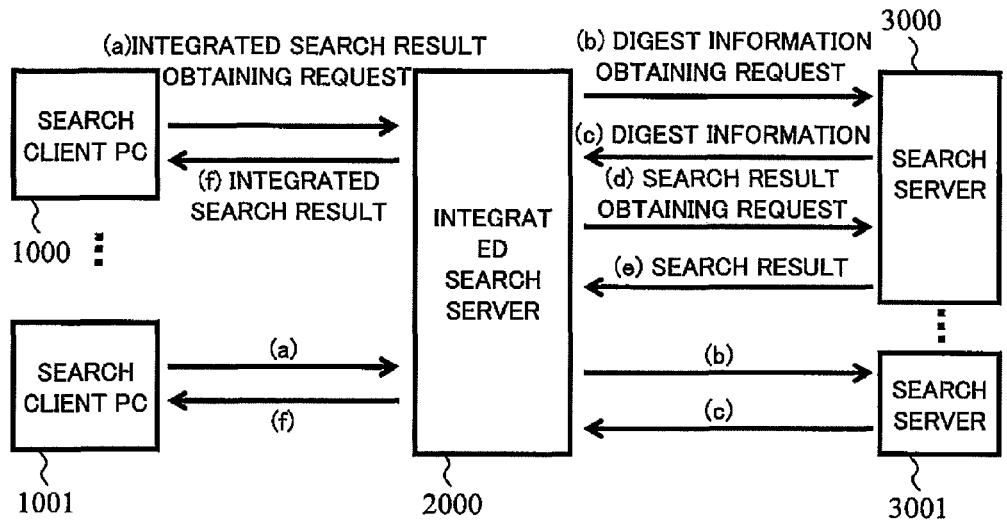
FIG. 6 is a diagram for explaining an outline of an integrated search process in which query search servers are narrowed down.

FIG. 6 is a diagram for explaining an outline of operations of the integrated search system in the first embodiment. Search client PCs 1000 and 1001 perform a search operation by the user and display the search result obtained from the integrated search server 2000. A plurality of the search client PCs 1000 which connect to one integrated search server 2000 may exist.

The integrated search server 2000 has a function of accepting the integrated search result obtaining requests from the search client PCs 1000 and 1001 (which is realized by the integrated search result obtaining request acceptance program 2210), a function of transmitting the search result obtaining requests including the search keywords in the received integrated search result obtaining requests, to the search servers 3000 and 3001 (which is realized by the search result obtaining request transmission program 2240), and a function of integrating the search results obtained from the search servers 3000 and 3001, and transmitting the integrated search results to the search client PCs 1000 and 1001 (which is realized by the integrated search result transmission program 2250).

Furthermore, in the present embodiment, as additional functions, the integrated search server 2000 has a function of transmitting the digest information obtaining requests for requesting the digest information regarding the search results or the search servers themselves, to the search servers 3000 and 3001 (which is realized by the digest information obtaining request transmission program 2220), and a function of narrowing down the search servers 3000 from which the search results are obtained, based on the digest information received from the respective search servers 3000 and 3001 (which is realized by the search server narrow-down program 2230). This digest information obtaining request also includes the search keyword therein.

The integrated search server 2000 is connected to the search client PCs 1000 and 1001, and the search servers 3000 and 3001. The search servers 3000 and 3001 have functions of performing the indexing (index creation process) for the file servers 4000 and 4001, respectively, and searching for the contents of the shared files of a file server.

In the present embodiment, the search servers 3000 and 3001 have a function of creating the digest information regarding the search results or the search server itself, and transmitting the digest information to the integrated search server 2000. It should be noted that, in the integrated search system, there are one or more search servers 3000 and 3001 which connect to one integrated search server 2000.

Hereinafter, the outline of the operations of the present embodiment will be described. When the user performs a search execution operation on the search client PC 1000, the search client PC 1000 transmits the integrated search result obtaining request to the integrated search server 2000 (arrow (a) in FIG. 6). This integrated search result obtaining request includes destination information on the integrated search server 2000 and the search keyword inputted by the user. For example, if an address of the integrated search server 2000 is server_f, and the search keyword is "budget", the integrated search result obtaining request is like "http://server_f/search?query=budget".

The integrated search server 2000 newly creates the digest information obtaining request from the integrated search result obtaining request received from the search client PC 1000, and transmits the created digest information obtaining request to the respective search servers 3000 and 3001 which are the search targets (arrow (b) in FIG. 6). This digest information obtaining request includes destination information on the search server, the search keyword, and the type of the digest information requested to be obtained. For example, if an address of the search server 3000 is server_a, the search keyword is "budget", and the type of the digest information requested to be obtained is a score of each document in the search result, the digest information obtaining request is like "http://server_a/search?query=budget&digest=score".

Each of the search servers 3000 and 3001 receives the digest information obtaining request from the integrated search server 2000, and subsequently, creates the digest information designated in the digest information obtaining request, and transmits the digest information to the integrated search server 2000. (Arrow (c) in FIG. 6). For example, if the search keyword is "budget", and the type of the digest information requested to be obtained is the score of each document in the search result, each of the search servers 3000 and 3001 performs the search in the search index by using "budget", and transmits the score of each document in the search result obtained by the search, as the digest information, to the integrated search server 2000.

When the integrated search server 2000 receives the digest information from all the search servers 3000 and 3001, the integrated search server 2000 narrows down the search servers from which the search results are obtained, based on the digest information. In this narrow-down process, the search servers are narrowed down to only the search servers 3000 having the search results required for creating the integrated search result. In an example of FIG. 6, the integrated search server 2000 narrows the search servers down to only the search servers 3000 based on the digest information obtained from each of the search servers 3000 and 3001, and obtains the search results of only the search servers 3000.

Next, the integrated search server 2000 transmits the search result obtaining request only to the search servers 3000 which have been narrowed down (arrow (d) in FIG. 6). The search result obtaining request includes the destination of the search server 3000 and the search keyword. For example, if the address of the search server 3000 is server_a, and the search keyword is "budget", the search result obtaining request is like "http://server_a/search?query=budget".

The search server 3000 which has received the search result obtaining request performs the search again by using the search keyword in the search result obtaining request, and transmits the search results to the integrated search server 2000 (arrow (e) in FIG. 6).

When the integrated search server 2000 receives the search results from all the search servers 3000 to which the search result obtaining request has been transmitted, the integrated search server 2000 creates the integrated search result in which the respective search results have been integrated. Then, the integrated search server 2000 transmits the created integrated search result to the search client PC 1000 (arrow (f) in FIG. 6).

Subsequently, as examples in which the present embodiment is applied, five methods will be described.

Method 1 is a method in which the number of search results is set as the digest information. Method 2 is a method in which a maximum value and a minimum value of the score of the document in the search result, and the number of search results are set as the digest information. Method 3 is a method in which the score of each document in the search result, the number of digest information target scores, and the number of search results are set as the digest information. Method 4 is a method in which types of all languages included in the search index are set as the digest information. Method 5 is a method in which information on an access right of the search client PC 1000 which is the transmitter of the integrated search result obtaining request, to each search server 3000, is set as the digest information.

<Digest Information Table According to Method 1>

FIG. 7 is a diagram showing an example of a digest information table 5000 in which the number of search results obtained from each search server 3000 by the integrated search server 2000 is managed according to Method 1.

In the table, identification information on the search server 3000 which has transmitted the number of search results is stored in a field of transmitting search server 5100. Moreover, in the table, the number of documents corresponding to a search condition after the search server 3000 has searched the search index by using the search keyword in the received search result obtaining request is stored in a field of the number of search results 5200.

<Integrated Search Process Corresponding to Method 1>

Figure 8:
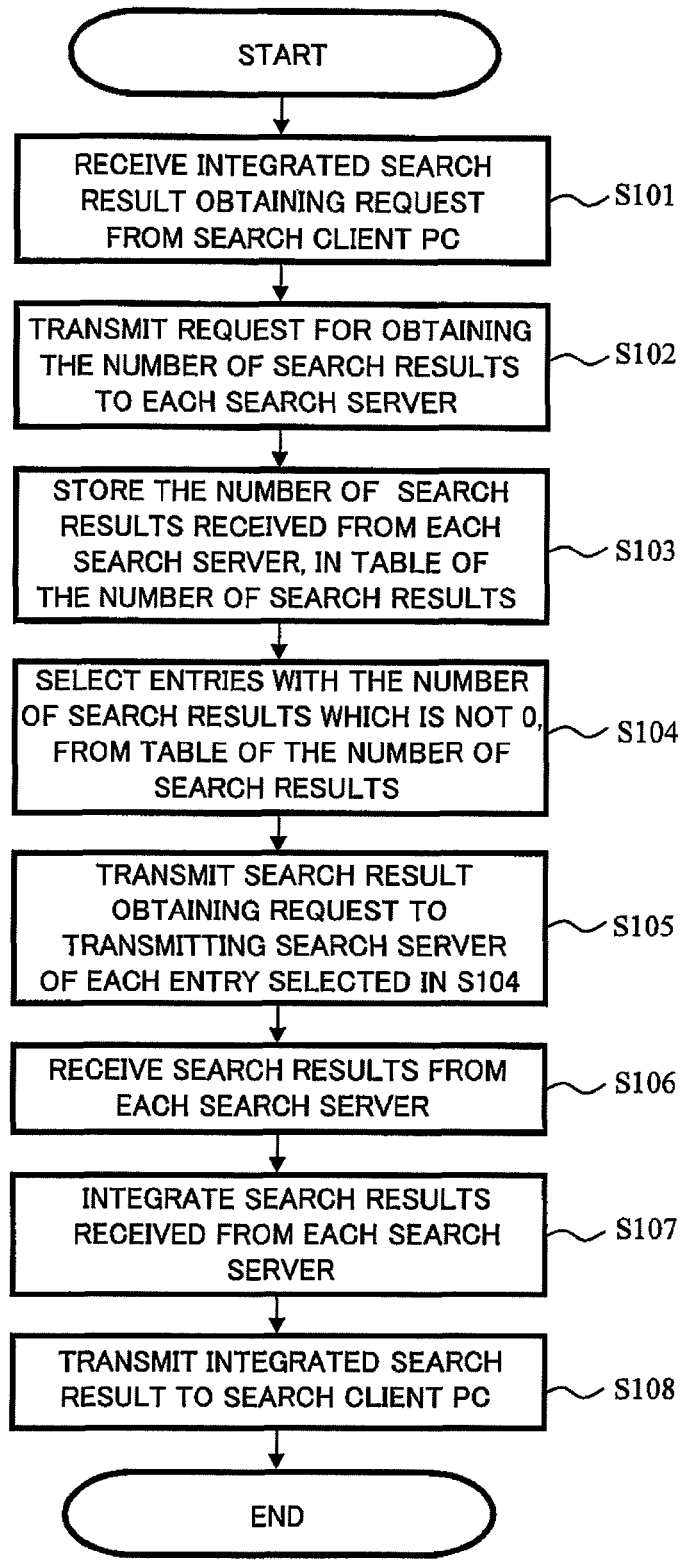
FIG. 8 is a flowchart for explaining contents of the integrated search process according to Method 1.

FIG. 8 is a flowchart for explaining contents of an integrated search process corresponding to Method 1. First, the integrated search server 2000 receives the integrated search result obtaining request from the search client PC 1000 (S101). Next, the integrated search server 2000 creates a request for obtaining the number of search results, including the search keyword in the integrated search result obtaining request, and transmits the request to each search server 3000 which is the search target (S102).

Each of the search servers 3000 to 3001 receives the request for obtaining the number of search results from the integrated search server 2000, and subsequently, uses the search keyword included in the request for obtaining the number of search results, to perform the search in the search index. Then, each of the search servers 3000 to 3001 transmits the number of search results regarding the search results obtained by the search operation, to the integrated search server 2000. The integrated search server 2000 receives the number of search results from all the search servers 3000 to 3001, and stores each entry including a combination of the identification information on the search server 3000 which is the transmitter, and the number of search results, in a table of the number of search results 5000 (S103).

Furthermore, the integrated search server 2000 selects all entries with the number of search results 5200 which is not 0, from entries in the table of the number of search results 5000 (S104). It should be noted that, here, by way of example, the number for preliminary elimination is set to "0", and entries with the number larger than it are selected, while the number for preliminary elimination can be set to an arbitrary number.

The integrated search server 2000 transmits the search result obtaining request to the transmitting search servers 5100 of the entries selected in step S104 (S105). The search server 3000 which has received the search result request performs the search in the search index by using the search keyword included in the search result request, and transmits the search results to the integrated search server 2000.

The integrated search server 2000 receives the search results from the target search servers 3000 to 3001 (S106). Subsequently, the integrated search server 2000 creates the integrated search result in which the search results received from the search servers 3000 to 3001 have been integrated (S107).

Lastly, the integrated search server 2000 transmits the integrated search result to the search client PC 1000 (S108). When the user selects a desired file from the integrated search result, the search client PC 1000 transmits the file obtaining request to the file server 4000 according to a selection instruction from the user, and obtains the file from the file server 4000.

<Specific Example of Method 1>

Here, an operation example will be described in which the number of search results is obtained from search servers A to E, and the search servers 3000 from which the search results are obtained are narrowed down.

First, the integrated search server 2000 receives the integrated search result obtaining request from the search client PC 1000 (corresponding to a process in S101), and transmits the search result obtaining request to the search servers A to E (corresponding to a process in S102). The integrated search server 2000 receives the number of search results from the search servers A to E, and creates the table of the number of search results 5000 of FIG. 7 (corresponding to a process in S103).

Figures 9, 10:
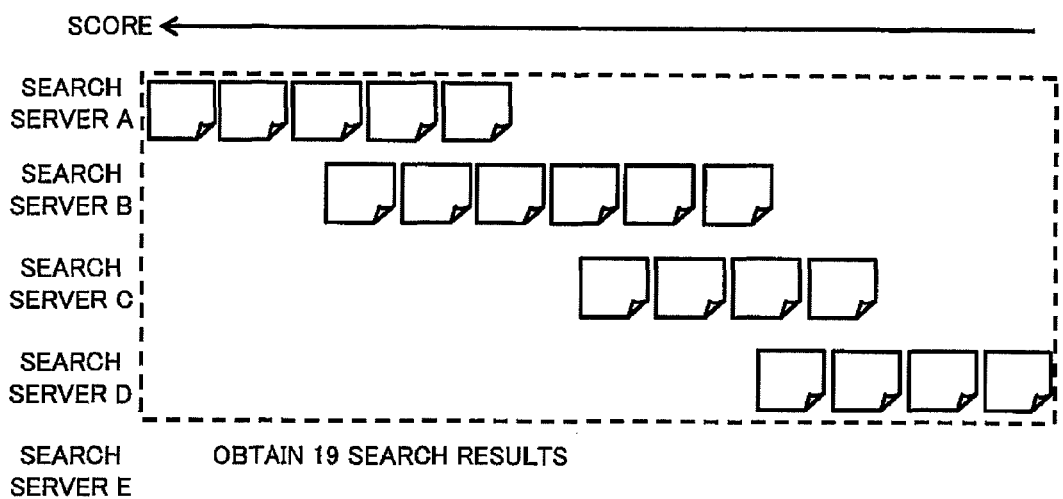
FIG. 9 is a diagram showing contents (example) of search results obtained according to Method 1.
FIG. 10 is a diagram showing the digest information table in Method 2.

Next, the integrated search server 2000 selects the entries of the search servers A, B, C and D with the number of search results 5200 which is not 0, from the entries in the table of the number of search results 5000 (corresponding to a process in S104). In FIG. 9, respective documents corresponding to the search results are illustrated. In this example, five documents in the search server A, six documents in the search server B, four documents in the search server C, and four documents in the search server D, which are a total of 19 documents, correspond thereto. The integrated search server 2000 transmits the search result obtaining request to the transmitting search servers A, B, C and D of the entries selected in S104 (corresponding to a process in S105), and receives a total of 19 search results from the search servers 3000 (corresponding to a process in S106).

Lastly, the integrated search server 2000 creates the integrated search result in which the received search results have been integrated (corresponding to a process in S107), and transmits the integrated search result to the search client PC 1000 (corresponding to a process in S108).

<Digest Information Table According to Method 2>

FIG. 10 is a diagram showing an example of a digest information table 6000 in which the digest information obtained from each search server 3000 by the integrated search server 2000 is managed according to Method 2.

In the digest information table 6000, the identification information on the search server 3000 which has transmitted the digest information is stored in a field of transmitting search server 6100.

The digest information obtained in Method 2 is three kinds of information, that is, a maximum score value 6200, a minimum score value 6300, and the number of search results 6400. Here, the score is a value of a degree of association which is added to each document by the search server 3000 in order to sort the documents which are the search results in descending order of the association with the search keyword. Among them, a largest value in the search results is stored in the maximum score value 6200, and a smallest value is stored in the minimum score value 6300. In the number of search results 6400, the number of documents existing in the search results is stored. It should be noted that a degree of height of the association with the search keyword is indicated by the score value, while this score value is indicated, for example, by the number of corresponding keywords included in the target file (the number of hits).

<Integrated Search Process Corresponding to Method 2>

FIG. 11 shows a temporarily-saved digest information table 7000 in which entries of the digest information table of FIG. 10 are replicated and temporarily saved in Method 2. The temporarily-saved digest information table 7000 shows a state in the course of the process of Method 2.

<Integrated Search Process Corresponding to Method 2>

Figure 12:
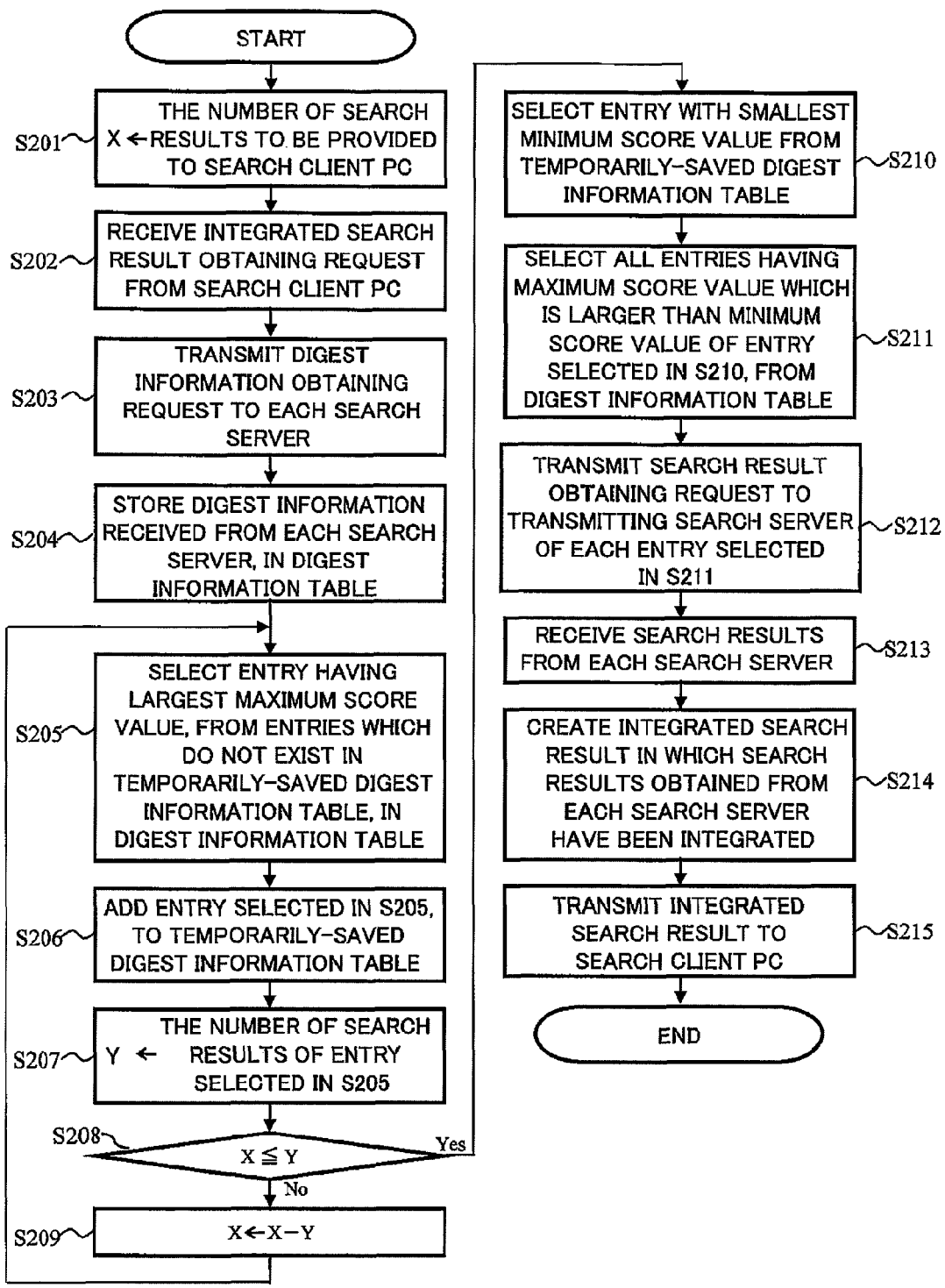
FIG. 12 is a flowchart for explaining the contents of the integrated search process according to Method 2.
Figure 1:
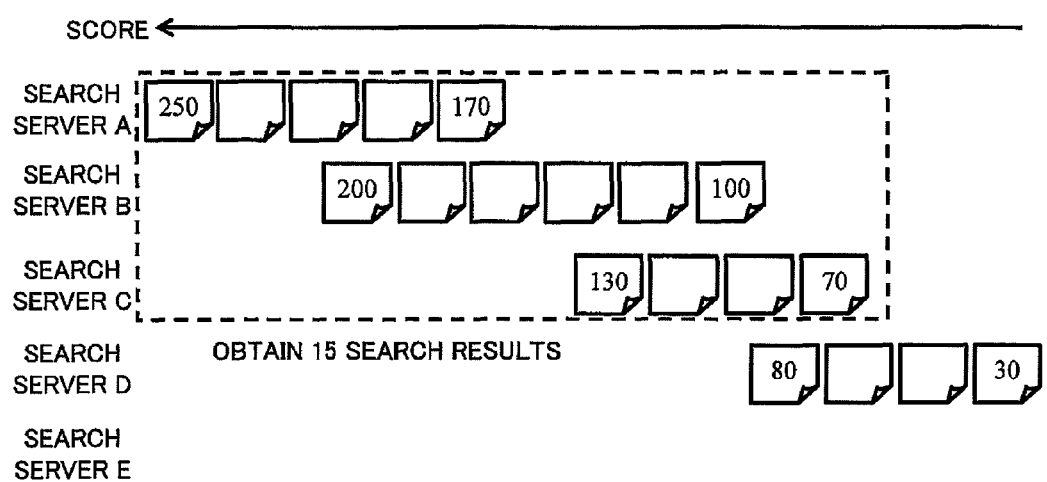

FIG. 12 is a flowchart for explaining the contents of the integrated search process corresponding to Method 2.

The integrated search server 2000 previously defines the number of search results to be provided to the search client PC 1000, and assigns the number to a variable X (S201). Subsequently, the integrated search server 2000 receives the integrated search result obtaining request from the search client PC 1000 (S202).

Next, the integrated search server 2000 creates the digest information obtaining request, and transmits the digest information obtaining request to each search server 3000 which is the search target (S203). This digest obtaining request is configured to have the search keyword in the integrated search result obtaining request, the maximum score value and the minimum score value in the search results, as well as the request for obtaining the number of search results.

Each search server 3000 receives the digest information obtaining request from the integrated search server 2000, and subsequently, uses the search keyword included in the digest information obtaining request, to perform the search in the search index. Then, each search server 3000 transmits the digest information configured to have the maximum score value and the minimum score value in the search results, as well as the number of search results, to the integrated search server 2000. The integrated search server 2000 receives the digest information from all the search servers 3000, and stores each entry including a combination of the identification information on the search server 3000 which is the transmitter, and the digest information, in the digest information table 6000 (S204).

Next, the integrated search server 2000 selects an entry with a largest maximum score value 6200, from entries which do not exist in the temporarily-saved digest information table 7000, in all the entries in the digest information table (S205). If a process in step S205 is performed for the first time, no entry exists in the temporarily-saved digest information table 7000, and thus, the entry with the largest maximum score value 6200 is selected from all the entries in the digest information table 6000. Then, the integrated search server 2000 adds the entry selected in step S205, to the temporarily-saved digest information table 7000 (S206).

Next, the integrated search server 2000 obtains the number of search results 6400 included in the entry selected in step S205 (S207). Furthermore, the integrated search server 2000 performs comparison with a value of the variable X obtained in step S201 (S208). If the variable X is larger than the number of search results 6400, the integrated search server 2000 assigns a value obtained by subtracting the number of search results 6400 from the variable X, to the variable X, and returns to the process in S205 (S209). In this way, processes in steps S205 to 209 are repeated until the variable X becomes smaller than the number of search results 6400 in the comparison in step S208.

On the other hand, if the variable X becomes smaller than the number of search results 6400 in the comparison in step S208, the integrated search server 2000 selects an entry with a smallest minimum score value 7300 from the temporarily-saved digest information table 7000 (S210). Then, the integrated search server 2000 selects all the entries having the maximum score value 6200 which is larger than the minimum score value 7300 of the entry selected in step S210, from the digest information table 6000 (S211). Furthermore, the integrated search server 2000 transmits the search result obtaining request to the transmitting search servers 6100 of the entries selected in step S211 (S212).

The search server 3000 which has received the search result request performs the search in the search index by using the search keyword included in the search result request, and transmits the search results to the integrated search server 2000.

The integrated search server 2000 receives the search results from all the search servers 3000 (S213). Subsequently, the integrated search server 2000 creates the integrated search result in which the search results received from the search servers 3000 have been integrated (S214). Lastly, the integrated search server 2000 transmits the integrated search result to the search client PC 1000 (S215).

<Specific Example of Method 2>
Here, an operation example of Method 2 will be described in which the digest information on the search results is obtained from five search servers 3000 including the search servers A to E, and the search servers 3000 from which the search results are obtained are narrowed down. In this operation example, the number of search results to be provided to the search client PC 1000 is assumed to be 8.

First, 8 which is the number of search results to be provided to the search client PC 1000 is assigned to the variable X (corresponding to a process in S201). Next, the integrated search server 2000 receives the integrated search result obtaining request from the search client PC 1000 (corresponding to a process in S202), and transmits the digest information obtaining request to the search servers A to E (corresponding to a process in S203). The integrated search server 2000 receives the digest information on the search results from the search servers A to E, and creates the digest information table 6000 of FIG. 10 (corresponding to a process in S204). FIG. 13 illustrates the respective documents corresponding to the search results in which the scores are described, and the same number of the documents as the number of search results in each search server 3000, which have been sorted in order of score. Among them, documents in which no score is described are documents with unknown scores.

Next, the integrated search server 2000 selects the entry of the search server A with the maximum score of 250, in a column of the maximum score value 6200 in the digest information table 6000 (corresponding to the process in S205). Then, the integrated search server 2000 adds the entry of the search server A which has been selected in step S205, to the temporarily-saved digest information table 7000 (corresponding to the process in S206).

Subsequently, the integrated search server 2000 obtains 5 which is the number of search results 6400 included in the entry of the search server A which has been selected in step S205 (corresponding to the process in S207). It is determined that 8 which has been stored in the variable X is larger than 5 which is the obtained number of search results (corresponding to the process in S208). Thus, according to this determination, it is found that the number of search results in the search server A is 5, and is less than 8 which is the number of search results to be provided to the search client PC 1000.

Since the variable X is larger than the number of search results, 3 which is a value obtained by subtracting 5 which is the obtained number of searches, from 8 in the variable X, is assigned to the variable X, and the process returns to step S205 (corresponding to the process in S209).

Again, the integrated search server 2000 selects the entry of the search server B with the largest maximum score value 6200 which is 200, from the entries of the search servers B to E which have not yet been described in the temporarily-saved digest information table 7000, in the digest information table 6000 (corresponding to the process in S205). The integrated search server 2000 adds the entry of the search server B which has been selected in step S205, to the temporarily-saved digest information table 7000 (corresponding to the process in S206).

Next, the integrated search server 2000 obtains 6 which is the number of search results 6400 included in the entry of the search server B which has been selected in step S205 (corresponding to the process in S207). At this time, it is determined that 3 which has been stored in the variable X is smaller than 6 which is the number of search results (corresponding to the process in S208). Thus, according to this determination, it is found that a sum of the numbers of search results 6400 in the search servers A and B has exceeded 8 which is the number of search results to be provided to the search client PC 1000.

Since the variable X is smaller than the number of search results, the integrated search server 2000 selects the entry of the search server B having the smallest minimum score value which is 100, from the entries of the search servers A and B which are described in the temporarily-saved digest information table 7000 (corresponding to a process in S210). The integrated search server 2000 selects the entries having the maximum score value 6200 which is larger than the minimum score value of 100 of the selected entry of the search server B, from the digest information table 6000 (S211). Since the maximum score values 6200 of the entries of the search servers A, B, C and D are 250, 200, 130 and 80, respectively, the entries of the search servers A, B and C having the maximum score value which is larger than 100 are selected. According to this process, the entries of the search servers 3000 having the search results which may be included in top eight search results in the integrated search result can be selected. In this example, one or more search results in each of the search servers A and B exist in the top eight search results in the integrated search result, and the search results included in the search server C may be included in the top eight search results in the integrated search result.

Subsequently, the integrated search server 2000 transmits the search result obtaining request to the transmitting search servers A, B and C of the entries selected in step S211 (corresponding to a process in S212), and receives a total of 15 search results from the search servers 3000 (corresponding to a process in S213).

Lastly, the integrated search server 2000 creates the integrated search result in which the received search results have been integrated (corresponding to a process in S214), and transmits the integrated search result to the search client PC 1000 (corresponding to a process in S215).

It should be noted that if ninth and lower search results are obtained (for example, if ninth to 16th scores from the top are obtained), the process is performed as follows.

Step S201 is not executed, and first, the integrated search server 2000 receives the search result obtaining request for the ninth to 16th scores from the top, from the search client PC 1000 (S202). Then, the integrated search server 2000 assigns 16 (the maximum number in the search result obtaining request) to X (S202'). S202' is a process inserted between steps S202 and S203, and is executed instead of S201 which has been omitted. It should be noted that steps S203 to S214 have not been changed from FIG. 12.

Lastly, the integrated search server 2000 transmits only the search results with the ninth to 16th scores from the top in the integrated search result, to the search client PC 1000 (S215).

In this way, for example, even if the number of search results which can be displayed on one screen of a display apparatus is limited, the search results on second and subsequent pages can be obtained, provided to the client PC 1000, and displayed on the screen, by adding some changes to the flowchart of FIG. 12.

<Digest Information Table According to Method 3>

FIG. 14 is a diagram showing a digest information table 8000 in which the digest information obtained from each search server 3000 by the integrated search server 2000 is managed according to Method 3. In this table, the identification information on the search server 3000 which has transmitted the digest information is stored in a field of transmitting search server 8100. The digest information used in Method 3 is configured to have a score 8200, the number of digest information target scores 8300, and the number of search results 8400.

This digest information is transmitted for each document in the search result from the search server 3000 to the integrated search server 2000. The score 8200 is the value of the degree of association which is added to each document by the search server 3000 in order to sort the documents which are the search results in descending order of the association with the search keyword. Here, the document with a higher value of the score 8200 is assumed to have a higher degree of association. The number of digest information target scores 8300 is the number of top scores in the search server 3000 which are provided to the integrated search server 2000, in the scores 8200 of the documents corresponding to the search condition after the search server 3000 has performed the search operation. Moreover, the number of search results 8400 is a total number of the documents corresponding to the search condition after the search server 3000 has performed the search operation. It should be noted that if the number of search results 8400 is too large, it is inefficient to set the search results with all the score values as processing targets, and therefore, only results with top k score values (k is an arbitrary integer) are set as the processing targets by setting the number of digest information target scores 8300. However, in FIG. 14, the number of digest information targets and the number of search results are the same number, which merely shows an example in which the number of search results is small and thus all the search results are set as the targets.

In Method 3, the integrated search server 2000 designates the maximum number of obtained scores to be obtained, in the digest information obtaining request transmitted to each search server 3000. When the search server 3000 receives the digest information obtaining request in which the maximum number of obtained scores has been designated, the search server 3000 uses the search keyword in the digest information obtaining request, to perform the search in the search index.

Next, the integrated search server 2000 obtains the score of each document in the search result, and sorts the scores in descending order. If the number of the scores has exceeded the maximum number of obtained scores, only the same number of the top scores as the maximum number of obtained scores are set as the digest information target scores. If the number of the scores of the respective documents is equal to or less than the maximum number of obtained scores, all the scores are set as the digest information target scores.

In the digest information table 8000 of FIG. 14, the respective obtained score values 8200 are arranged in descending order and registered, based on the digest information obtained from the search servers A to E. Among them, for the search server E in which there is no document corresponding to the search condition, an entry with the value of the score 8200 which is null is registered. All the entries with the same transmitting search server 3000 have the same value of the number of digest information target scores 8300 and the same value of the number of search results 8400.

<Integrated Search Process Corresponding to Method 3>

Figure 15:
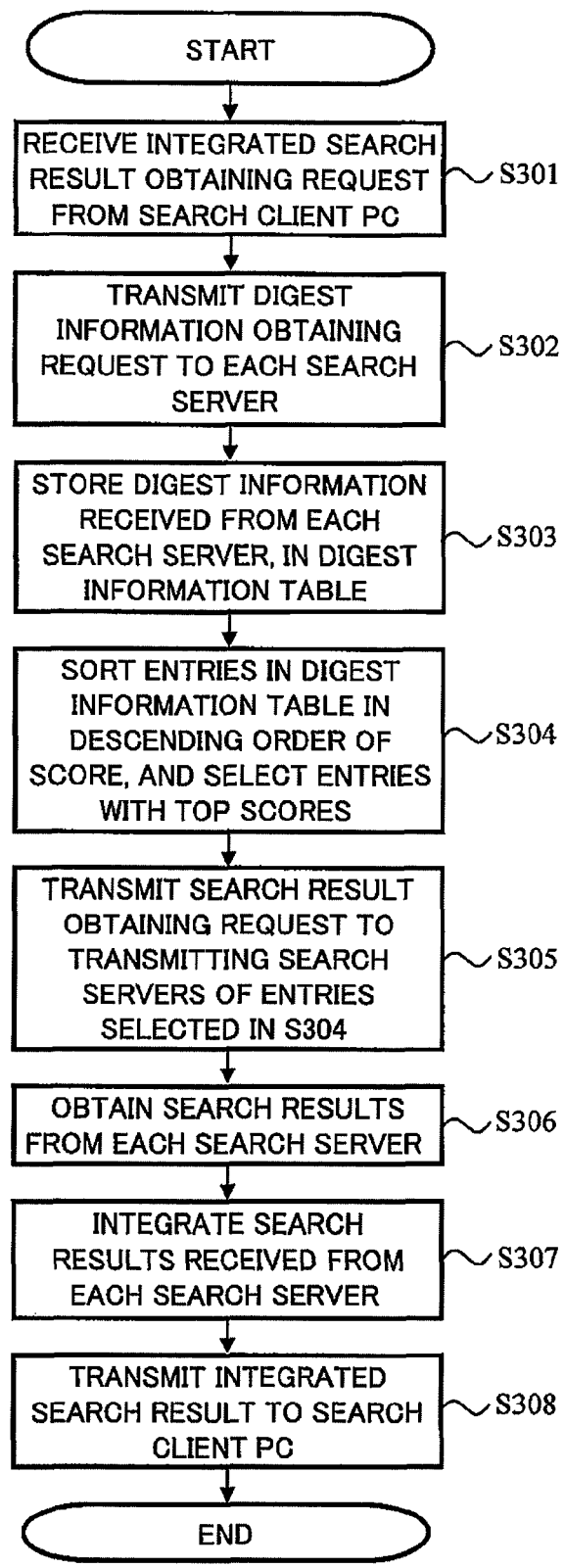
FIG. 15 is a flowchart for explaining the contents of the integrated search process according to Method 3.

FIG. 15 is a flowchart for explaining the contents of the integrated search process corresponding to Method 3.

First, the integrated search server 2000 receives the integrated search result obtaining request from the search client PC 1000 (S301). Then, the integrated search server 2000 creates the digest information obtaining request including the search keyword in the integrated search result obtaining request and the maximum number of obtained scores, and transmits the digest information obtaining request to each search server 3000 which is the search target (S302). In this maximum number of obtained scores, the number of search results to be provided to the search client PC 1000 has been designated.

Each search server 3000 receives the digest information obtaining request from the integrated search server 2000, and subsequently, uses the search keyword in the digest information obtaining request, to perform the search in the search index.

Next, each search server 3000 transmits the digest information for each document in the search result obtained by the search operation, to the integrated search server 2000. This digest information is configured to have the score of the document, the number of digest information target scores, and the number of search results.

The integrated search server 2000 receives the digest information from all the search servers 3000, and stores each entry including a combination of the identification information on the search server 3000 which is the transmitter, the score 8200 of the document, the number of digest information target scores 8300, and the number of search results 8400, in the digest information table 8000 (S303). Moreover, the integrated search server 2000 sorts all the entries in the digest information table 8000 in descending order of the score 8200, and selects top entries within the number of search results to be provided to the client PC (S304).

Next, the integrated search server 2000 transmits the search result obtaining request to the transmitting search servers 8100 of the entries selected in step S304 (S305). The search server 3000 which has received the search result request performs the search in the search index by using the search keyword included in the search result obtaining request, and transmits the search results to the integrated search server 2000. The integrated search server 2000 receives the search results from all the search servers 3000 (S306).

Subsequently, the integrated search server 2000 creates the integrated search result in which the search results received from the search servers 3000 have been integrated (S307). Lastly, the integrated search server 2000 transmits the integrated search result to the search client PC 1000 (S308).

<Specific Example of Method 3>

Here, an operation example will be described in which the digest information is obtained from the search servers A to E, and the search servers 3000 from which the search results are obtained are narrowed down. In this operation example, the number of search results to be provided to the search client PC 1000 is assumed to be 8.

First, the integrated search server 2000 receives the integrated search result obtaining request from the search client PC 1000 (corresponding to a process in S301), and transmits the digest information obtaining request in which the maximum number of obtained scores has been designated as 8, to the search servers A to E (corresponding to a process in S302). The integrated search server 2000 receives the digest information from the search servers A to E, and creates the digest information table 8000 of FIG. 14 (corresponding to a process in S303).

Figure 16:
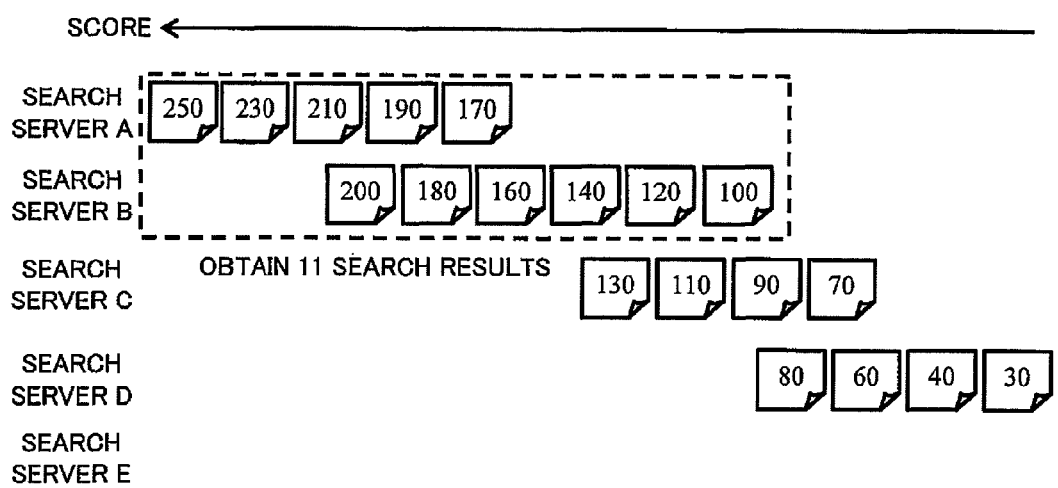
FIG. 16 is a diagram showing the contents (example) of the search results obtained according to Method 3.

Next, the integrated search server 2000 sorts the entries in the digest information table 8000 in descending order of the score 8200, and selects the top eight entries (corresponding to a process in S304). FIG. 16 illustrates the respective documents corresponding to the search results. 250, 230, 210, 190 and 170 in a case where the transmitting search server 8100 is the search server A, as well as 200, 180 and 160 in a case where the transmitting search server 8100 is the search server B correspond to the top eight scores.

The integrated search server 2000 transmits the search result obtaining request to the transmitting search servers A and B of the entries selected in step S304 (corresponding to a process in S305), and receives a total of 11 search results from all the two search servers 3000 (corresponding to a process in S306).

Lastly, the integrated search server 2000 creates the integrated search result in which the received search results have been integrated (corresponding to a process in S307), and transmits the integrated search result to the search client PC 1000 (corresponding to a process in S308). In step S308, the integrated search server 2000 narrows 11 search results down to 8, and then provides the results to the client PC 1000.

<Integrated Search Process Corresponding to Method 3' (Variation of Method 3)>

Figure 17:
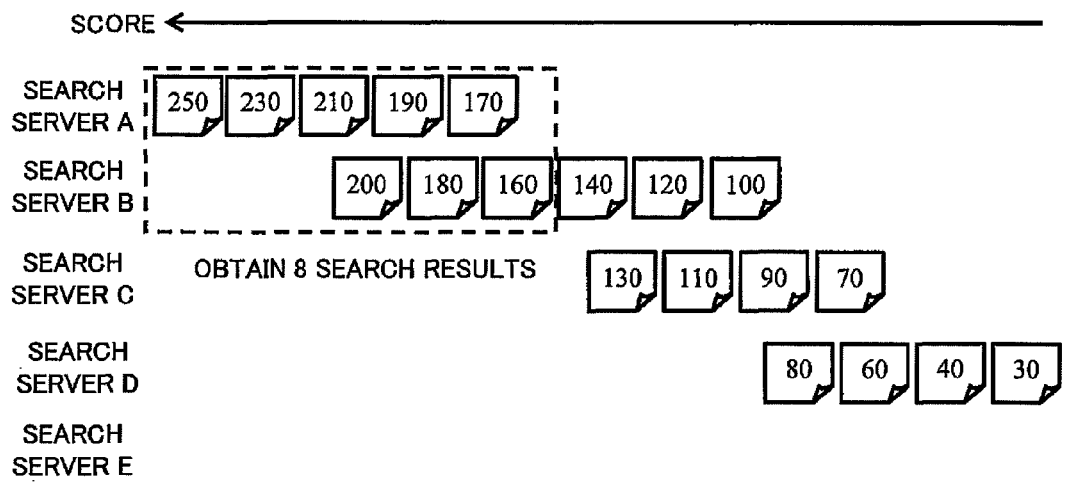
FIG. 17 is a diagram showing the contents of the search results obtained according to Method 3 (in a case where the narrowing down is further performed).

FIG. 17 is a conceptual diagram for explaining a method of further narrowing the search results of the documents required for creating the integrated search result, down to less than those in an aspect of FIG. 16, and obtaining the search results from the search servers 3000. In other words, while the results are lastly narrowed down to a desired number in the integrated search server 2000 and provided to the client PC 1000 in FIG. 16, the integrated search server 2000 obtains only the results which have been narrowed down, from each search server in FIG. 17.

This method is realized by adding changes to step S305 for the integrated search server 2000, and the search server 3000, in Method 3. The process in step S305 to which the change has been added is as follows.

The integrated search server 2000 counts the number of the entries for each transmitting search server 3000, in the entries selected in step S304. Then, the integrated search server 2000 transmits the search result obtaining request in which the documents with the same number of top scores as the number of the counted entries are designated to be obtained, to the corresponding search server 3000 (S305). When the search server 3000 receives the search result obtaining request, the search server 3000 changes to transmit only the search results of the documents with the same number of top scores as the number designated in the search result obtaining request, to the integrated search server 2000.

FIG. 17 illustrates the respective documents corresponding to the search results in a case where this method (Method 3') is used. As the top eight entries, five entries with the scores of 250, 230, 210, 190 and 170 are selected for the search server A as the transmitting search server 8100, and three entries with the scores of 200, 180 and 160 are selected for the search server B as the transmitting search server 8100. In step S305, the integrated search server 2000 transmits the search result obtaining request in which the search results of the documents with the top five scores are designated to be obtained, to the search server A, and transmits the search result obtaining request in which the search results of the documents with the top three scores are designated to be obtained, to the search server B. For example, the search result obtaining request which is transmitted to the search server A with the address of server_a is "http://server_a/search?query=budget&rank=1-5", and the search result obtaining request which is transmitted to the search server B with the address of server_b is "http://server_b/search?query=budget&rank=1-3". By using this method, in step S306, the integrated search server 2000 can obtain only a total of eight search results, which is the number of search results to be provided to the search client PC 1000, from the search servers A and B.

<Used Language Table According to Method 4>

Figure 18:
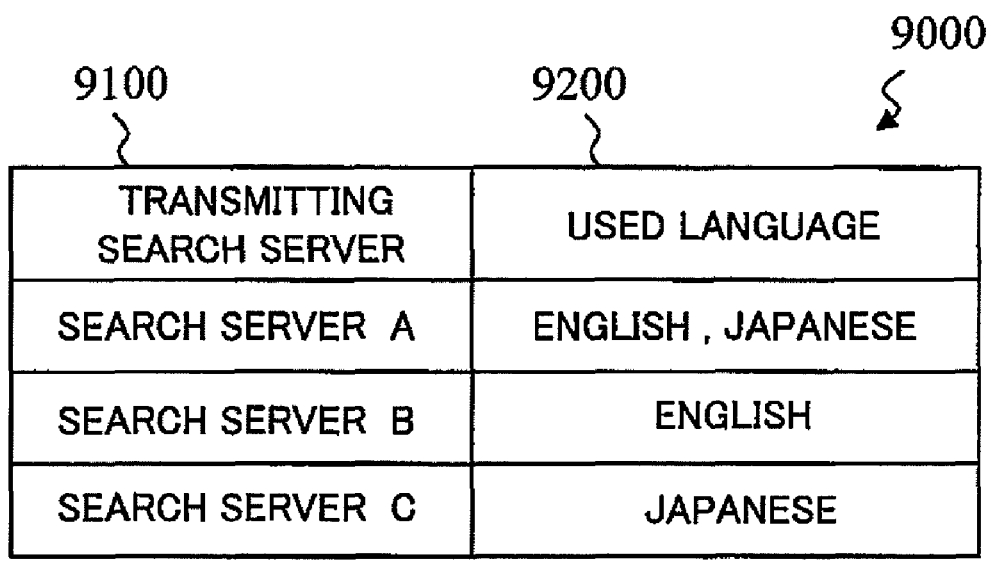
FIG. 18 is a diagram showing the digest information table in Method 4.

FIG. 18 is a diagram showing a used language table 9000 with which the integrated search server 2000 manages identification information on a used language in the search server search index, which has been obtained from each search server 3000, according to Method 4.

In this table, the identification information on the search server 3000 which has transmitted the identification information on the used language is stored in a field of transmitting search server 9100, and the identification information on the used language which has been obtained from the transmitting search server 9100 is stored in a field of used language 9200.

<Integrated Search Process Corresponding to Method 4>

Figure 19:
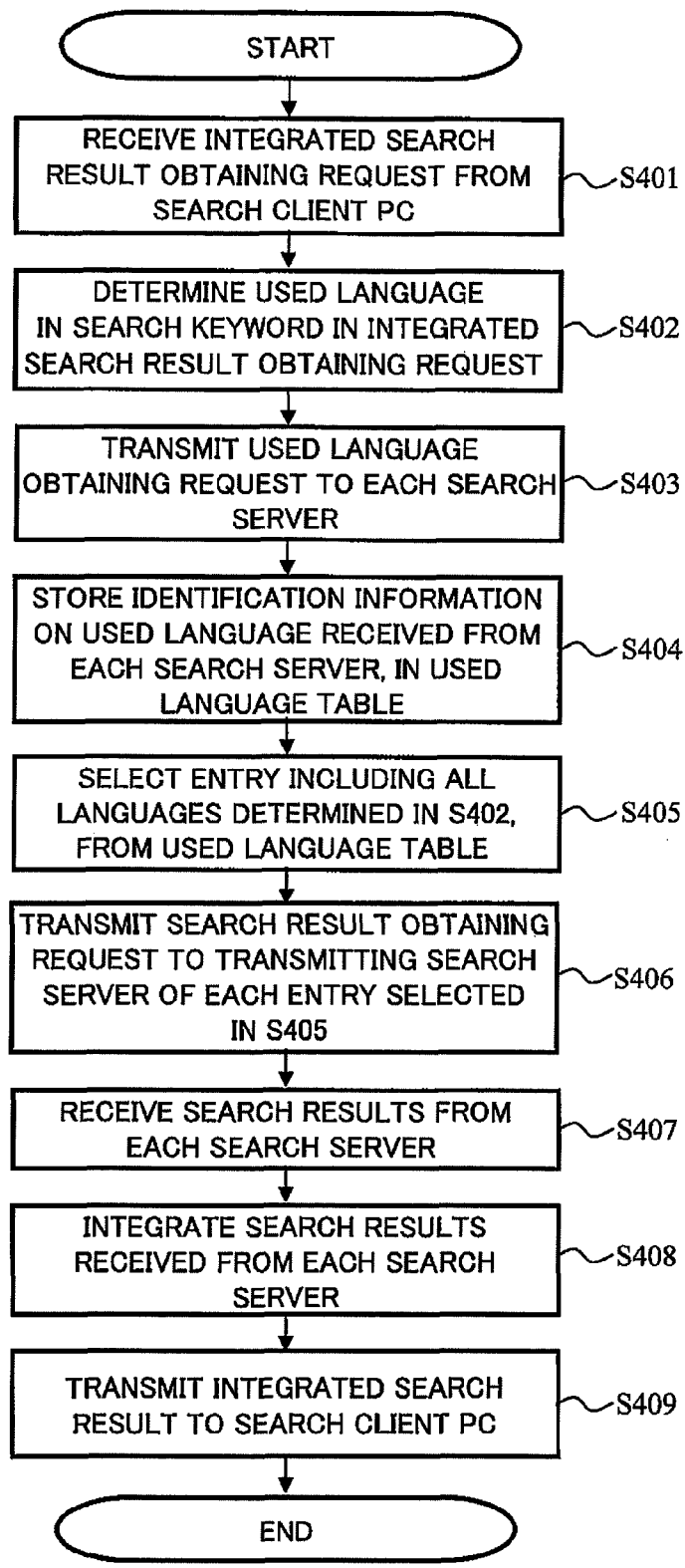
FIG. 19 is a flowchart for explaining the contents of the integrated search process according to Method 4.

FIG. 19 is a flowchart for explaining the contents of the integrated search process corresponding to Method 4.

First, the integrated search server 2000 receives the integrated search result obtaining request from the search client PC 1000 (S401). When the integrated search server 2000 receives the integrated search result obtaining request, the integrated search server 2000 determines a type of a used language in the search keyword in the integrated search result obtaining request (S402).

Next, the integrated search server 2000 transmits a used language obtaining request to each search server 3000 which is the search target (S403). Each search server 3000 receives the used language obtaining request from the integrated search server 2000, and subsequently, checks the types of all the used languages included in the search index. Then, the search server 3000 transmits the identification information on all the used languages included in the search index, to the integrated search server 2000.

The integrated search server 2000 receives the identification information on the used languages from all the search servers 3000, and stores each entry including a combination of the identification information on the search server 3000 which is the transmitter and the identification information on the used languages, in the used language table 9000 (S404). Then, the integrated search server 2000 selects an entry including all the identification information on the used languages determined in step S402, in the identification information on the used language 9200, from the used language table 9000 (S405).

Furthermore, the integrated search server 2000 transmits the search result obtaining request including the search keyword in the integrated search result obtaining request, to the transmitting search server 9100 of the entry selected in step S405 (S406). The search server 3000 which has received the search result obtaining request performs the search in the search index by using the search keyword included in the search result obtaining request, and transmits the search results to the integrated search server 2000.

The integrated search server 2000 receives the search results from all the search servers 3000 (S407). Subsequently, the integrated search server 2000 creates the integrated search result in which the search results received from the search servers 3000 have been integrated (S408).

Lastly, the integrated search server 2000 transmits the integrated search result to the search client PC 1000 (S409).

<Specific Example of Method 4>

Here, an operation example will be described in which the identification information on the used language is obtained from the search servers A to C, and the search servers 3000 from which the search results are obtained are narrowed down. In this operation example, it is premised that two search keywords in English and Japanese are included in the integrated search result obtaining request transmitted from the search client PC 1000, and an AND search is performed. The integrated search server 2000 receives the integrated search result obtaining request from the search client PC 1000 (corresponding to a process in S401), and determines that the two search keywords included in the integrated search result obtaining request are English and Japanese, respectively (corresponding to a process in S402). Subsequently, the integrated search server 2000 transmits the used language obtaining request to the search servers A to C (corresponding to a process in S403). The integrated search server 2000 receives the identification information on the used language from the search servers A to C, and creates the used language table 9000 of FIG. 18 (corresponding to a process in S404).

Next, the integrated search server 2000 selects the entry of the search server A which is the entry including the identification information on both English and Japanese in the identification information on the used language 9200, from the used language table 9000 (S405). The integrated search server 2000 transmits the search result obtaining request to the transmitting search server A of the entry selected in step S405 (corresponding to a process in S406), and receives the search results from the search server A (corresponding to a process in S407).

Lastly, the integrated search server 2000 creates the integrated search result in which the received search results have been integrated (corresponding to a process in S408), and transmits the integrated search result to the search client PC 1000 (corresponding to a process in S409).

<Access Right Table According to Method 5>

FIG. 20 is a diagram showing an access right table 10000 with which the integrated search server 2000 manages the access right of the search client PC 1000 which is the transmitter of the integrated search result obtaining request, to the search server 3000, according to Method 5.

In this table, the identification information on the search server 3000 which has transmitted the information on the access right is stored in a field of transmitting search server 10100, and whether or not the search client PC 1000 which is the transmitter of the integrated search result obtaining request has the access right to the search server 3000 is stored in a field of access right 10200. For example, if the search client PC 1000 has the access right to the search server A, "YES" is stored in the access right 10200 of the entry of the search server A as the transmitting search server 10100. If the search client PC 1000 has no access right to the search server C, "NO" is stored in the access right 10200 of the entry of the search server C as the transmitting search server 10100.

<Integrated Search Process Corresponding to Method 5>

Figure 21:
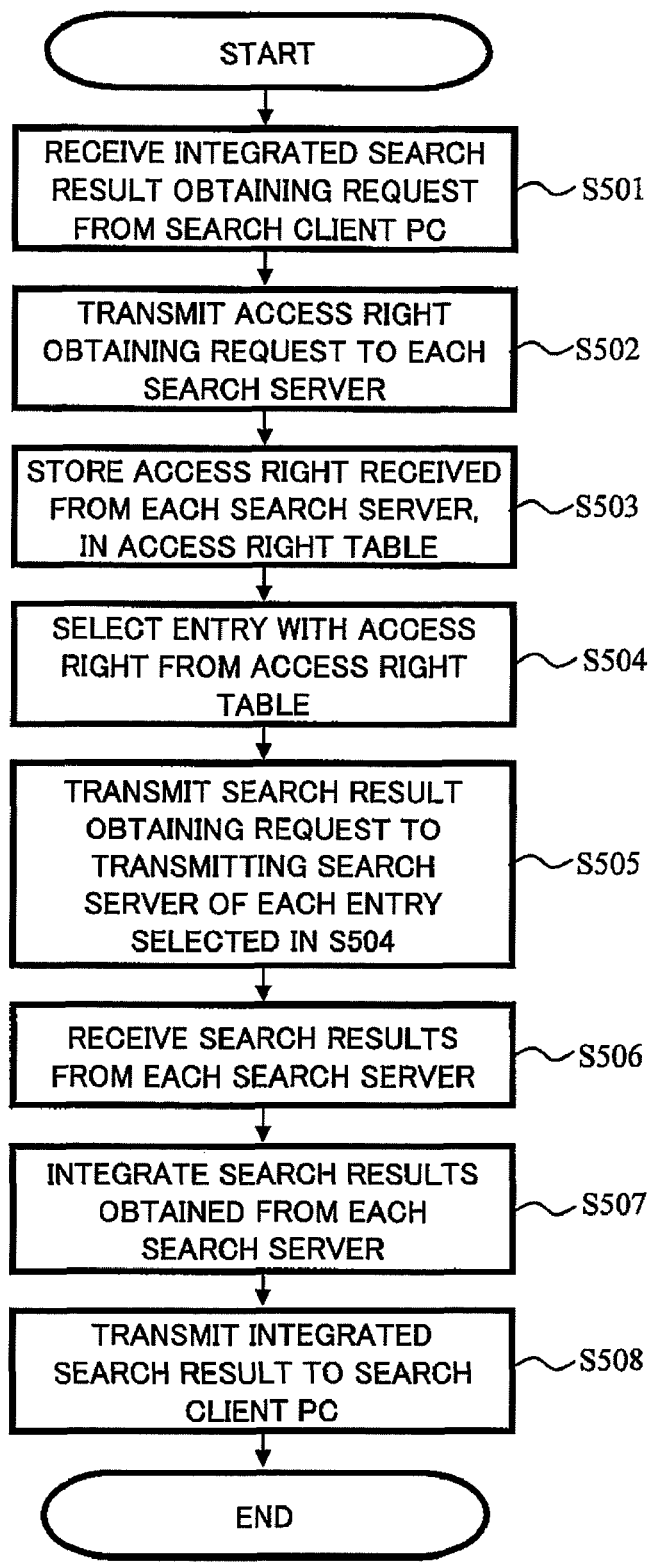
FIG. 21 is a flowchart for explaining the contents of the integrated search process according to Method 5.
Figure 2:
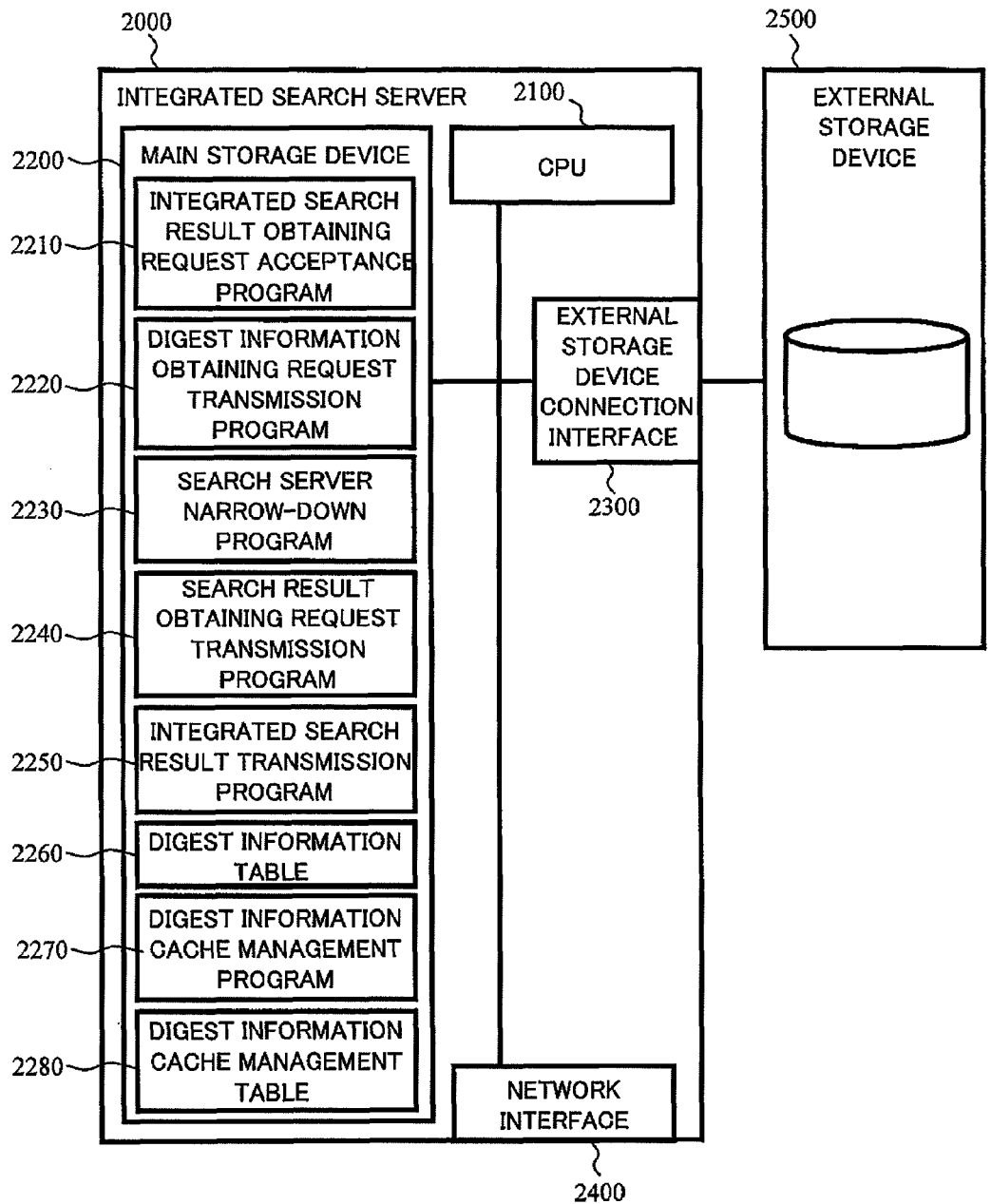

FIG. 21 is a flowchart for explaining the contents of the integrated search process corresponding to Method 5.

First, the integrated search server 2000 receives the integrated search result obtaining request from the search client PC 1000 (S501). When the integrated search server 2000 receives the integrated search result obtaining request, the integrated search server 2000 transmits a request for obtaining the access right of the search client PC 1000 to the search server 3000, to each search server 3000 which is the search target (S502). This access right obtaining request includes identification information on the search client PC 1000 which is the transmitter of the integrated search result obtaining request.

Each search server 3000 receives the access right obtaining request from the integrated search server 2000, and subsequently, checks whether or not there is the access right corresponding to the identification information on the search client PC 1000, which is included in the access right obtaining request. Then, whether or not there is the access right of the search client PC 1000 is transmitted from the search server 3000 to the integrated search server 2000.

The integrated search server 2000 receives the information on the access right from all the search servers 3000, and stores each entry including a combination of the identification information on the transmitting search server 10100 and the information on the access right 10200, in the access right table 10000 (S503).

Next, the integrated search server 2000 selects an entry with the access right from the access right table 10000 (S504). Moreover, the integrated search server 2000 transmits the search result obtaining request including the search keyword in the integrated search result obtaining request, to the transmitting search server 10100 of the entry selected in step S504 (S505).

The search server 3000 which has received the search result obtaining request performs the search in the search index by using the search keyword included in the search result obtaining request, and transmits the search results to the integrated search server 2000.

The integrated search server 2000 receives the search results from all the search servers 3000 (S506). Subsequently, the integrated search server 2000 creates the integrated search result in which the search results received from the search servers 3000 have been integrated (S507).

Lastly, the integrated search server 2000 transmits the integrated search result to the search client PC 1000 (S508).

<Specific Example of Method 5>

Here, an operation example will be described in which whether or not there is the access right of the search client PC 1000 is obtained from the search servers A to C, and the search servers 3000 from which the search results are obtained are narrowed down. In this operation example, the search client PC 1000 is assumed to have the access right to the search servers A and B.

The integrated search server 2000 receives the integrated search result obtaining request from the search client PC 1000 (corresponding to a process in S501), and transmits the request for obtaining the access right of the search client PC 1000, to the search servers A to C (corresponding to a process in S502).

Then, the integrated search server 2000 receives the information on the access right of the search client PC 1000, from the search servers A to C, and creates the access right table 10000 of FIG. 20 (corresponding to a process in S503).

Next, the integrated search server 2000 selects the entries of the search servers A and B with the access right from the access right table 10000 (corresponding to a process in S504). Then, the integrated search server 2000 transmits the search result obtaining request to the transmitting search servers A and B of the entries selected in step S504 (corresponding to a process in S505), and receives the search results from the search servers A and B (corresponding to a process in S506).

Lastly, the integrated search server 2000 creates the integrated search result in which the received search results have been integrated (corresponding to a process in S507), and transmits the integrated search result to the search client PC 1000 (S508).

<Regarding Combination of Methods 1 to 5>

The digest information in Methods 1 to 5 can also be combined to further narrow down the search servers 3000 to which the search result obtaining request is transmitted. Among them, the digest information in Method 2 includes the digest information in Method 1, and thus, Method 1 and Method 2 are not targeted for the combination of the digest information. Similarly, the digest information in Method 3 includes the digest information in Method 1 and Method 2, and thus, Method 1 and Method 3, Method 2 and Method 3, as well as Method 1, Method 2 and Method 3 are not targeted for the combination of the digest information.

As the digest information, a combination of any of Methods 1 to 3 (including 3') and Method 4 and/or Method 5, as well as a combination of Method 4 and Method 5 are conceivable.

As an example of the combination of the digest information, it is assumed that the digest information has been used in which the types of all the languages in the search index, which are the digest information in Method 4, and the information on the access right of the search client PC 1000 which is the transmitter of the integrated search result obtaining request, to the search server, which is the digest information in Method 5, have been combined. If this digest information has been used, the search servers 3000 are narrowed down to only the search servers 3000 in which all the types of the languages in the search keyword included in the integrated search result obtaining request are included in the search index, and to which the access right is included in the search client PC 1000 which is the transmitter of the integrated search result obtaining request. The search servers 3000 to which the search result obtaining request is transmitted can be further limited by using such a combination of a plurality of pieces of the digest information.

Moreover, in FIG. 6, even if the integrated search result obtaining request (an integrated search request) has been issued from a plurality of the search client PCs 1000 to 1001 simultaneously or at some different times, the integrated search server 2000 can use the digest information corresponding to the above described Methods 1 to 5 or a possible combination thereof to narrow down the search servers, and obtain desired search results, for each integrated search request. In this case, the digest information corresponding to each integrated search request may be the same or may be different. Furthermore, the search client PCs 1000 to 1001 may be able to designate the type of the digest information (any of Methods 1 to 5, or which combination thereof is used), or the type of the digest information may be previously defined for each search client PC. Moreover, the integrated search server 2000 may analyze the search condition included in the integrated search request, and decide a more appropriate type of the digest information. In that case, for example, it is possible to use a method of managing a past search history and deciding appropriate digest information based on the history and the like.

(2) Second Embodiment

In the first embodiment, the digest information is obtained through the digest information obtaining request for each integrated search request, which, however, is not limited thereto. The digest information may be cached and reused.

Consequently, as an application of the present invention, a method (second embodiment) will be described in which the integrated search server 2000 caches the digest information obtained through the digest information obtaining request transmitted to each search server, and the digest information obtaining request to each search server is omitted for the second and subsequent times. It should be noted that, in this method, the configuration of the search client PC 1000 is not changed from the configuration of FIG. 2, and thus a description thereof is omitted.

<Internal Configuration of Integrated Search Server>

FIG. 22 is a diagram showing the internal configuration of the integrated search server 2000 according to the present embodiment. The configuration of FIG. 22 is almost the same as that of FIG. 3, while the following points are different. Hereinafter, the difference will be mainly described.

In FIG. 22, a digest information cache management program 2270 and a digest information cache management table 2280 on the main storage device 2200 are newly added, and the process in the digest information obtaining request transmission program 2220 is different from that of FIG. 3.

The digest information cache management program 2270 has a function of returning digest information on the search server which has been requested by the digest information obtaining request transmission program 2220, and a function of, when a cache deletion request is received from the file server 4000, deleting a cache designated in the cache deletion request.

The digest information cache management table 2280 is an area for caching the digest information obtained from the search server 3000 in the past.

The digest information obtaining request transmission program 2220 has a function of obtaining the digest information corresponding to the integrated search result obtaining request, from the digest information cache management program 2270, and only if there is no corresponding digest information, transmitting the digest information obtaining request including the search keyword in the integrated search result obtaining request and the type of the requested digest information, to each search server 3000. Similar to the first embodiment, the functions of the respective programs may be modularized.

<Internal Configuration of Search Server>

Figure 23:
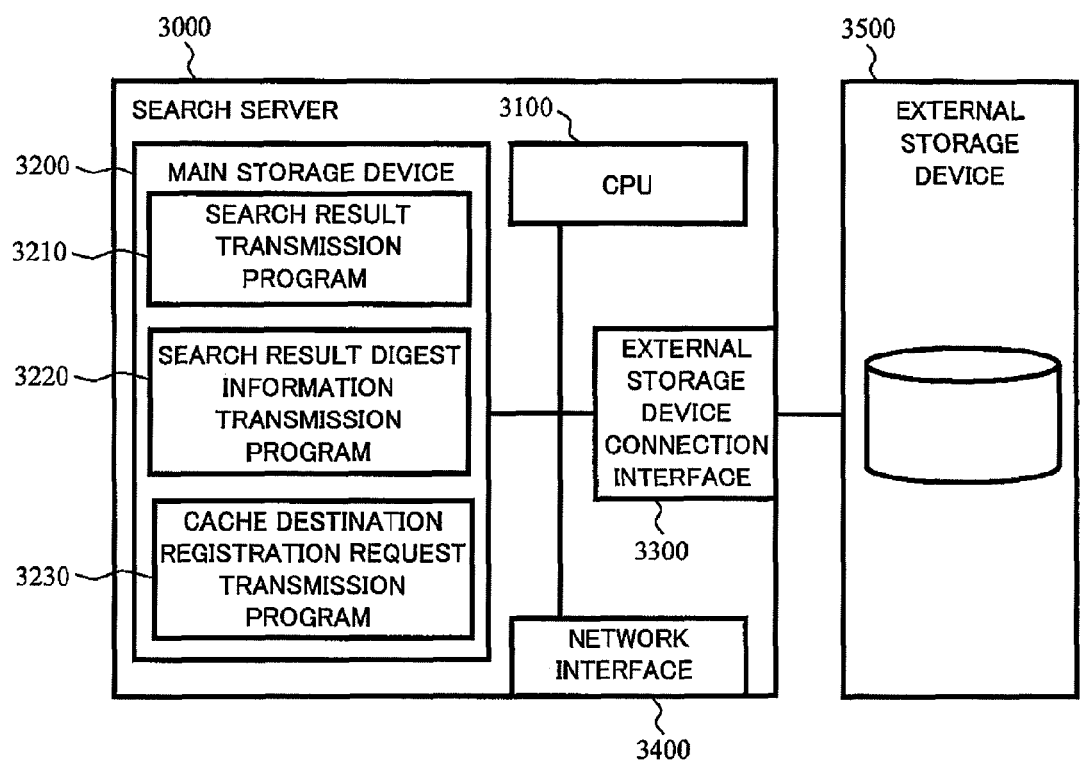
FIG. 23 is a diagram showing the internal configuration of the search server according to the second embodiment.
Figure 2:
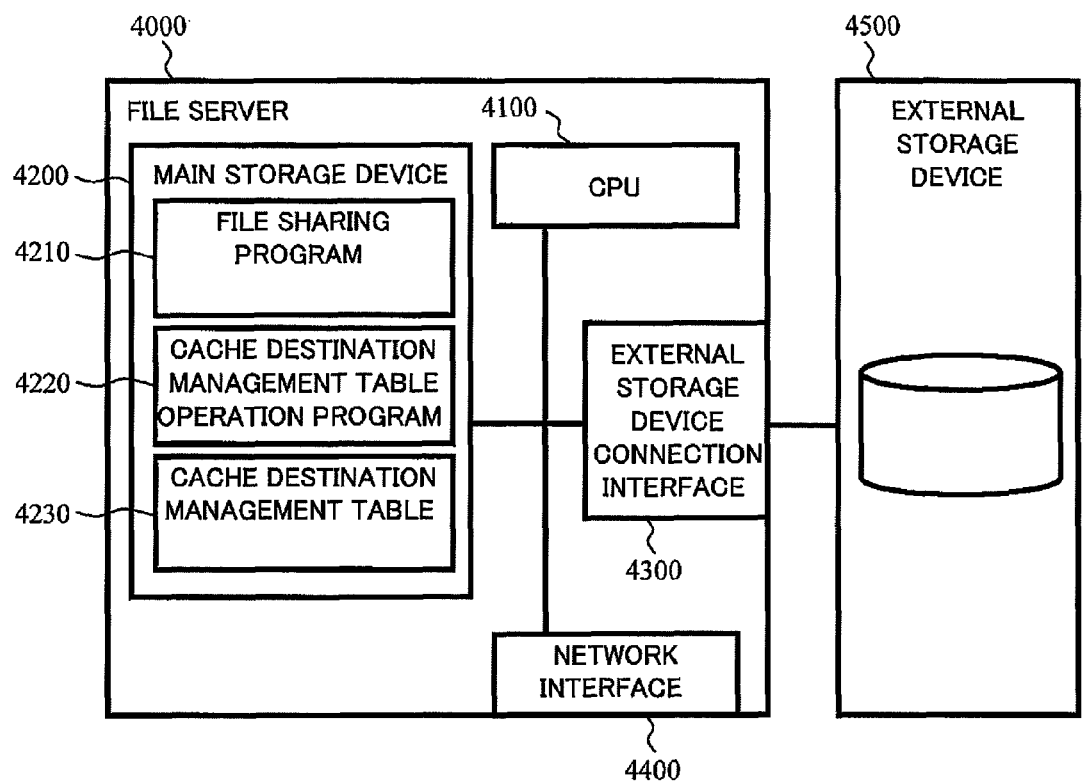

FIG. 23 is a diagram showing the internal configuration of the search server 3000 according to the present embodiment. The configuration of FIG. 23 is almost the same as that of FIG. 4, while the following points are different. Hereinafter, the difference will be mainly described.

In FIG. 23, a cache destination registration request transmission program 3230 on the main storage device 3200 is newly added. The cache destination registration request transmission program 3230 has a function of, when the search result obtaining request including cache destination information is received from the integrated search server 2000, transmitting a cache destination registration request including the cache destination information, to the search server 3000 which is the search target. The function of the program may be modularized.

<Internal Configuration of File Server>

FIG. 24 is a diagram showing the internal configuration of the file server 4000 according to the present embodiment. The configuration of FIG. 24 is almost the same as that of FIG. 5, while the following points are different. Hereinafter, the difference will be mainly described.

In FIG. 24, a cache destination management table operation program 4220 and a cache destination management table 4230 on the main storage device 4200 are newly added.

The cache destination management table operation program 4220 has a function of, if the search server 3000 has accessed the shared file, judging that the search server 3000 has updated the search index by the indexing, and transmitting the cache deletion request to the integrated search server 2000 so that information for narrowing down the search servers 3000, which has been cached in the integrated search server 2000, is invalidated. The function of the program may be modularized.

The cache destination management table 4230 is a management table in which identification information on the integrated search server 2000 which has cached the digest information issued by the search server having the search index in which the shared file on the file server 4000 has been registered is stored.

<Each Function in Integrated Search System, and Outline of Operations of System>

Figure 25:
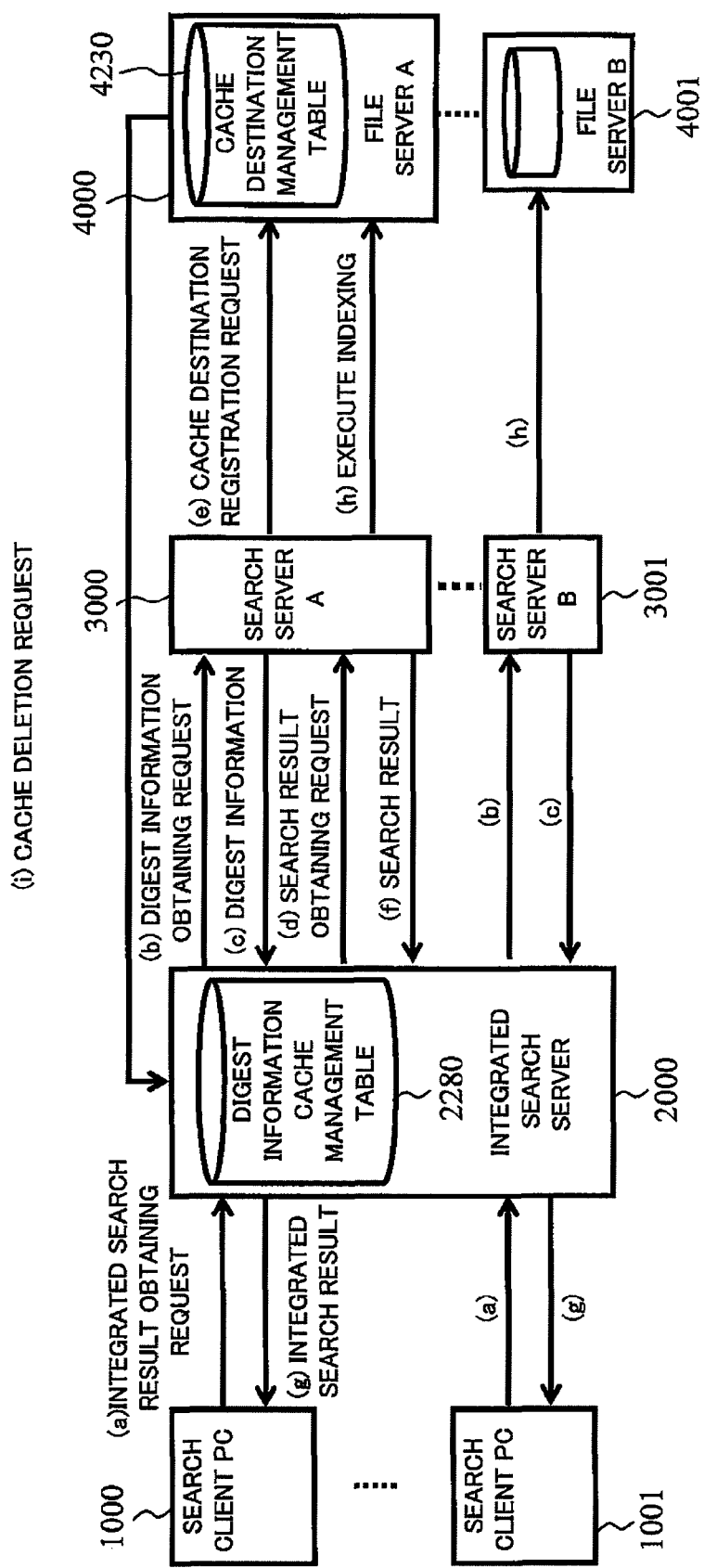
FIG. 25 is a diagram for explaining an outline of an integrated search process using a cache, in which the query search servers are narrowed down, according to the second embodiment.

FIG. 25 is a diagram for explaining an outline of the operations in the integrated search system according to the present embodiment. Note that the search client PCs 1000 and 1001 are assumed to have a function of transmitting the integrated search result obtaining request to the integrated search server 2000, and displaying the integrated search result obtained from the integrated search server 2000.

The integrated search server 2000 has a function of accepting the integrated search result obtaining request from at least one of the search client PCs 1000 and 1001, the function of transmitting the digest information obtaining request for requesting the digest information regarding the search results or the search server 3000, to the search server 3000, a function of caching the digest information received from each of the search servers 3000 and 3001, in the digest information cache management table 2280, the function of narrowing down the search servers from which the search results are obtained, based on the digest information, a function of transmitting the search result obtaining request including the cache destination information in which the identification information on the integrated search server itself has been stored, and the search keyword in the integrated search result obtaining request, to the search servers, the function of integrating the search results obtained from the search servers and transmitting the integrated search result to the search client, and a function of, when the cache deletion request is received from the file server 4000, deleting the entry designated in the cache deletion request, from the digest information cache management table 2280.

The integrated search server 2000 is connected to the search client PCs 1000 and 1001, the search servers 3000 and 3001, as well as the file servers 4000 and 4001, via the network 100.

The search servers 3000 and 3001 have a function of performing the indexing (index creation) for files stored on the file servers 4000 and 4001, and searching for the files stored on the file servers 4000 and 4001, the function of creating the digest information regarding the search results or the search server, and transmitting the digest information to the integrated search server, and a function of receiving the search result obtaining request including the cache destination information, from the integrated search server 2000, and transmitting the cache destination registration request for causing the identification information on the integrated search server which has cached the digest information, to be registered, to the file server 4000 which is the search target of the search server 3000. This search server 3000 is connected to the integrated search server 2000 and the file server 4000 via the network 100.

The file servers 4000 and 4001 have the function of sharing the file via the network 100, a function of receiving the cache destination registration request from the search server 3000, and storing the identification information on the integrated search server 2000 which is a cache destination described in this request, in the cache destination management table 4230, and a function of, when the search server 3000 has executed the indexing, transmitting the cache deletion request to the integrated search server 2000 having the digest information issued by the search server 3000.

In the integrated search system of the present embodiment having the functions as described above, when the user performs the search execution operation on the search client PC 1000, the search client PC 1000 transmits the integrated search result obtaining request to the integrated search server 2000 (arrow (a) in FIG. 25). This integrated search result obtaining request is configured to have the destination information on the integrated search server 2000 and the search keyword inputted by the user.

From the digest information cache management table 2280, the integrated search server 2000 checks whether or not there is the digest information which corresponds to the integrated search result obtaining request and has been obtained last time. If there is intended digest information in the digest information cache management table 2280, the transmission of the digest information obtaining request to each search server 3000 (arrow (b) in FIG. 25) and the obtaining of the digest information from each search server (arrow (c) in FIG. 25) can be omitted.

If there is no intended digest information in the digest information cache management table 2280, the transmission of the digest information obtaining request to each search server (arrow (b) in FIG. 25) and the obtaining of the digest information from each search server (arrow (c) in FIG. 25), which are processes corresponding to arrows (b) and (c) in FIG. 6, are performed. The integrated search server 2000 stores the digest information obtained from the search server, in the digest information cache management table 2280.

Next, the integrated search server 2000 narrows down the search servers 3000 from which the search results are obtained, based on the digest information corresponding to the integrated search result registered in the cache. In this narrow-down process, the search servers are narrowed down to only the search servers 3000 having the search results required for creating the integrated search result. Moreover, the integrated search server 2000 transmits the search result obtaining request only to the search servers 3000 which have been narrowed down (arrow (d) in FIG. 25). The search result obtaining request includes the destination of the search server 3000, the search keyword, and the cache destination information. This cache destination information includes the identification information on the integrated search server 2000 which is the transmitter of the search result obtaining request. For example, if the address of the search server 3000 is server_a, the address of the integrated search server 2000 which is the transmitter of the search result obtaining request is server_f, and the search keyword is "budget", the search result obtaining request is like "http://server_a/search?query=budget&cache=server_f".

The search server 3000 which has received the search result obtaining request transmits the cache destination registration request to the file server 4000 which is the search target (arrow (e) in FIG. 25). This cache destination registration request includes the identification information on the search server 3000 which is a transmitter of the cache destination registration request, and the cache destination information in the search result obtaining request. For example, if an address of the file server 4000 is fserver_a, the address of the integrated search server 2000 is server_f, and the address of the search server 3000 is server_a, the cache destination registration request is like "http://fserver_a/entry?cache=server_f&from=server_a".

When the file server 4000 receives the cache destination registration request from the search server 3000, the file server 4000 stores the identification information on the integrated search server 2000 which is the cache destination in the cache destination information, along with the identification information on the search server 3000 which is the transmitter, in the cache destination management table.

The search server 3000 transmits the cache destination registration request to the file server 4000, and subsequently, performs the search again by using the search keyword in the search result obtaining request, and transmits the search results to the integrated search server 2000 (arrow (f) in FIG. 25). When the integrated search server 2000 receives the search results from all the search servers 3000 to which the search result obtaining request has been transmitted, the integrated search server 2000 creates the integrated search result in which the respective search results have been integrated. Next, the integrated search server 2000 transmits the created integrated search result to the search client PC 1000 (arrow (g) in FIG. 25).

In this process, when the search result obtaining request is received from the search client PC 1000, if the integrated search server 2000 has registered the digest information corresponding to the search result obtaining request, in the digest information cache management table 2280, the digest information is not obtained, and the information for narrowing down which has been registered in the digest information cache management table 2280 can be used to transmit the search result obtaining request. Thereby, in comparison with the first embodiment, if a cache hit occurs, communication overheads required for obtaining the digest information can be reduced.

If the search server 3000 has executed an indexing process for the file server 4000, contents of the search index in the search server 3000 are rewritten, and thus, the information for narrowing down the search servers, which is currently cached in the integrated search server 2000, needs to be invalidated. Therefore, if the search server 3000 accesses the shared file (arrow (h) in FIG. 25), the file server 4000 judges that the search server 3000 has executed the indexing, and transmits the cache deletion request for a corresponding cache to the integrated search server 2000 (arrow (i) in FIG. 25). This cache deletion request includes the identification information on the search server 3000 which has executed the indexing. For example, if the address of the integrated search server 2000 is server_f, and the address of the search server 3000 is server_a, the cache deletion request is like "http://server_f/purge?from=server_a".

When the integrated search server 2000 receives the cache deletion request from the file server 4000, the integrated search server 2000 deletes the corresponding cache. Thereby, the cache area can be efficiently managed.

Hereinafter, in the second embodiment, an example of applying the above described Method 4 (the method in which the used language is set as the digest information) will be described. It should be noted that, of course, the second embodiment can obtain an advantageous effect of reducing the communication overheads for the digest information obtaining request by caching the digest information in the integrated search server 2000, even in a case of a method other than Method 4.

<Used Language Cache Management Table>

FIG. 26 is a diagram showing a used language cache management table 9900 in which the identification information on the used language obtained from the search server 3000 by the integrated search server 2000 is stored.

In the used language cache management table 9900, the field of transmitting search server 9100 and the field of used language 9200 are the same as FIG. 18, while the date and time when the identification information on the used language 9200 has been obtained from the search server 3000 and stored in the used language cache management table 9900 are stored in a field of registration date and time 9300. The registration date and time 9300 may be used to invalidate an entry existing for more than a certain period of time.

<Cache Destination Management Table>

FIG. 27 is a diagram showing the cache destination management table 4230 retained in the file server 4000. The search server 3000 which has received the search result obtaining request from the integrated search server 2000 transmits the cache destination registration request to the file server 4000 which is the search target.

When the file server 4000 receives this cache destination registration request, the file server 4000 registers an entry in the cache destination management table 4230. The identification information on the search server 3000 which is the transmitter of the cache destination registration request is stored in a field of transmitting search server 4231 in the entry. Moreover, the identification information on the integrated search server 2000 which is the transmitter of the search result obtaining request which triggers the cache destination registration request is stored in a field of cache destination-integrated search server 4232 in the entry. For example, a first entry in FIG. 27 indicates that the cache of the digest information on the search server A exists in the integrated search server described in the field of cache destination-integrated search server 4232.

<Integrated Search Process>

Figure 28:
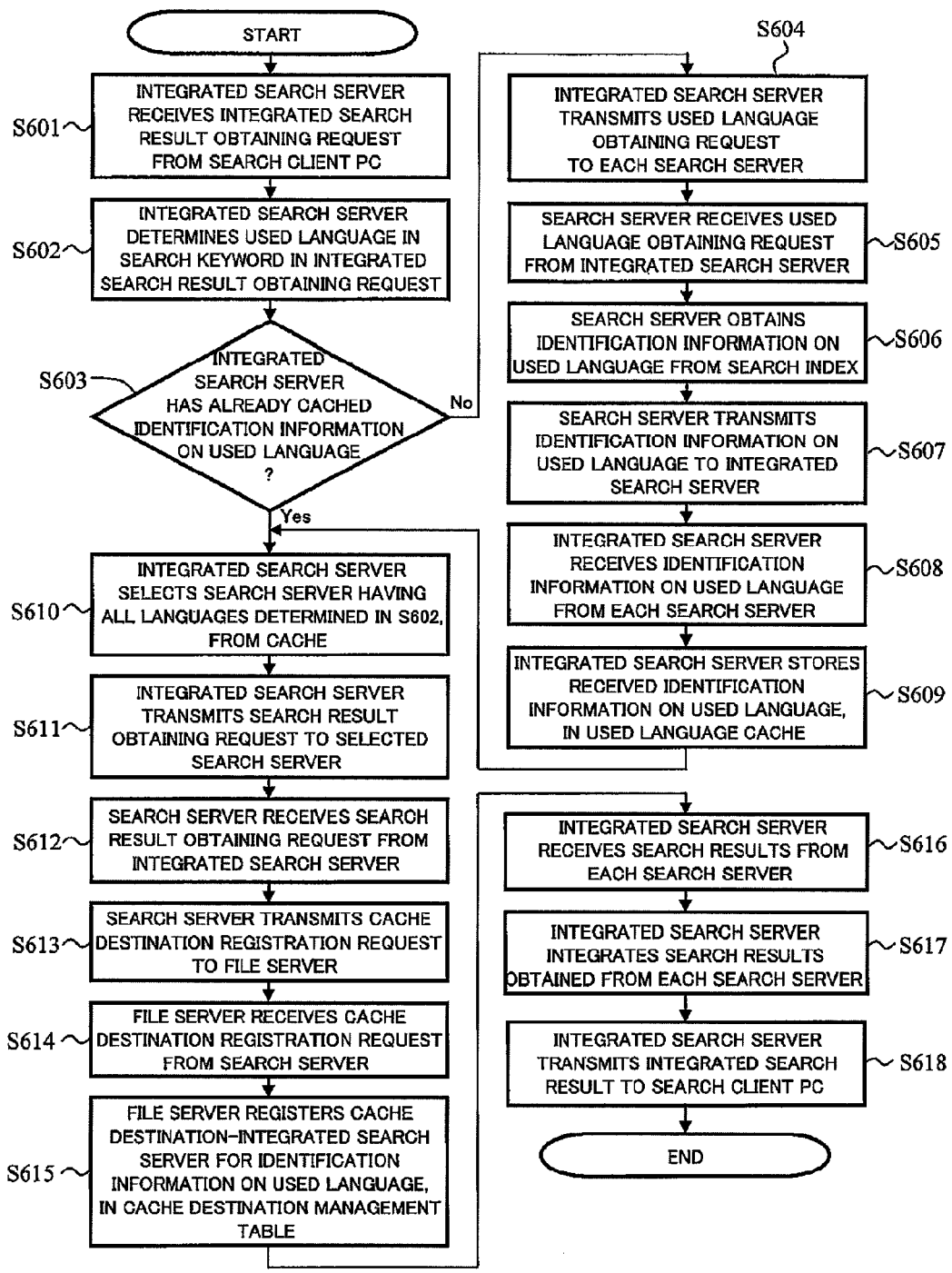
FIG. 28 is a flowchart for explaining the contents of the integrated search process according to Method 4 in the second embodiment.

FIG. 28 is a flowchart for explaining the operations of the integrated search process according to the second embodiment. It should be noted that, in FIG. 28, the contents of the process will be described by using Method 4 described in the first embodiment. Moreover, FIG. 28 is a flowchart in which a process for registering the identification information on the used language 9200, in the used language cache management table 9900, is added to the flowchart of FIG. 19. Steps S401 to S402 and steps S601 to S602 are the same processes, step S403 and step S604 are the same process, and steps S407 to S409 and steps S616 to S618 are the same processes, respectively, and thus, descriptions thereof are omitted. On the other hand, steps S609 to S611 have process contents different from those of steps S404 to S406. Hereinafter, differences between FIG. 19 and FIG. 28 will be mainly described.

First, the integrated search server 2000 receives the integrated search result obtaining request from the search client PC 1000 (S601), and determines the type of the used language 9200 in the search keyword in the integrated search result obtaining request (S602).

Next, the integrated search server 2000 checks whether or not the identification information on the used language 9200 in each search server 3000 which is the search target has already been cached in the used language cache management table 9900 (S603). If the identification information on the used languages in the search indices in all the search servers 3000 has already been cached, the process proceeds to step S610.

On the other hand, if the identification information has not been cached, the process proceeds to step S604, and the integrated search server 2000 transmits the used language obtaining request to the corresponding search server 3000 (S604). The corresponding search server 3000 receives this used language obtaining request from the integrated search server 2000 (S605), and obtains the types of all the languages included in the search index (S606). The search server 3000 transmits the types of all the languages included in the search index, as the identification information on the used language, to the integrated search server 2000 (S607).

The integrated search server 2000 receives the identification information on the used language in the search index from each search server (S608), and stores the entry including the combination of the identification information on the search server 3000 which is the transmitter and the identification information on the used language 9200, in the used language cache management table 9900 (S609).

Subsequently, an entry including all the types of the languages determined in S602, within the identification information on the used language 9200 is selected from the used language cache management table 9900 (S610).

Next, the search result obtaining request also including a request for updating the cache destination management table 4230 is transmitted to the transmitting search server 3000 of the selected entry (S611). When the search server 3000 receives this search result obtaining request (S612), the search server 3000 transmits the cache destination registration request including the identification information on the integrated search server 2000 which has cached the identification information on the used language, to the file server 4000 which is the search target (S613).

When the file server 4000 receives the cache destination registration request from the search server 3000 (S614), the file server 4000 adds an entry including a combination of the identification information on the integrated search server 2000 within the cache destination management table 4230, and the identification information on the search server 3000 which is the transmitter of the cache destination registration request, to the cache destination management table 4230 (S615).

After a process in step S613, the search server 3000 transmits the search results to the integrated search server 2000, and the integrated search server 2000 receives the search results from all the search servers (S616).

Then, the integrated search server 2000 creates the integrated search result (S617), and lastly, transmits the integrated search result to the search client PC 1000 (S618).

<Entry Deletion Process in File Server>

Figure 29:
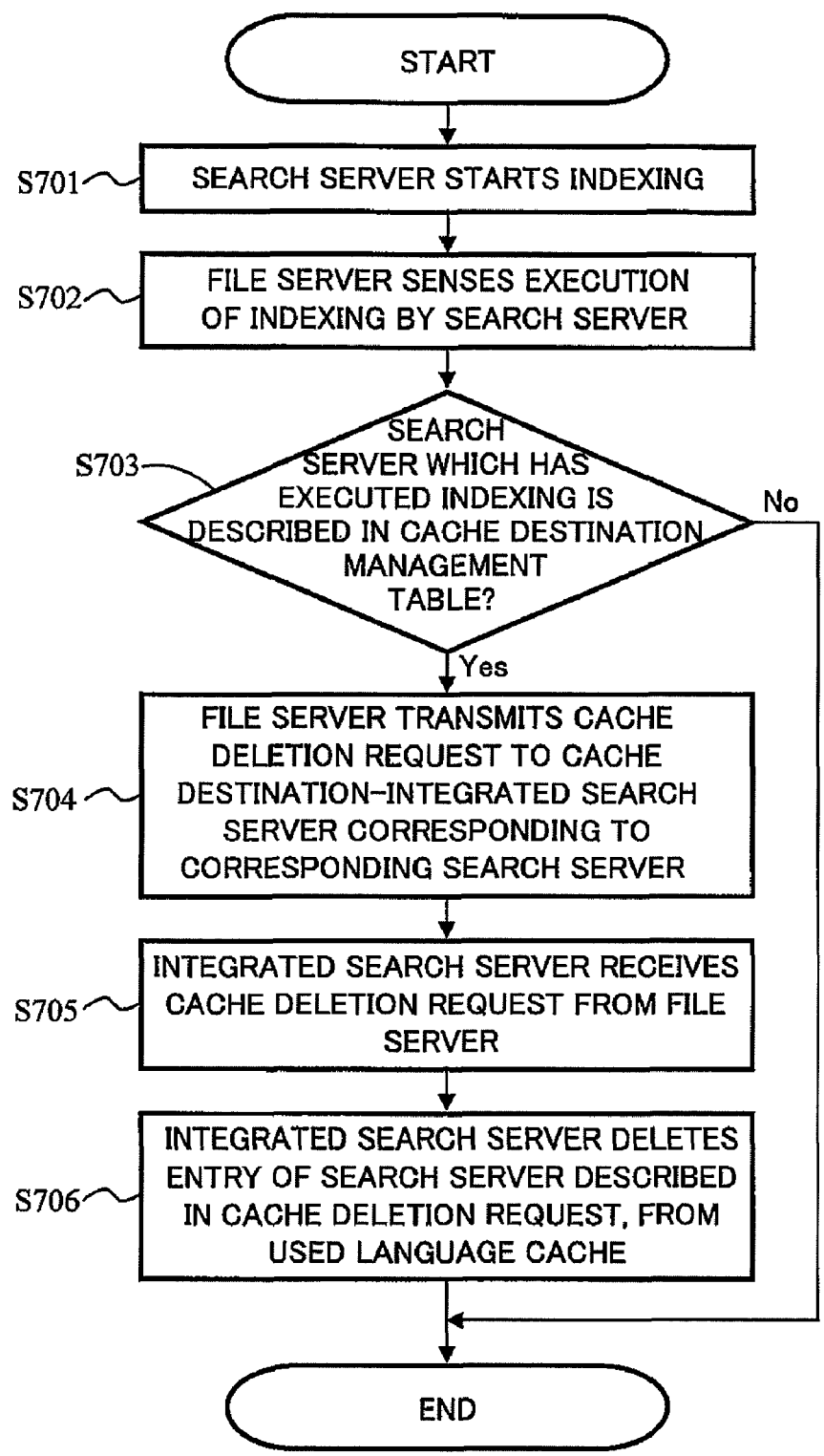
FIG. 29 is a flowchart for explaining a process for deleting an entry from the used language cache management table in the integrated search server in the second embodiment.

FIG. 29 is a flowchart for explaining a process for deleting the entry in the cache management table 9000, in the file server. In other words, in the process, the execution of the indexing process for the file server 4000 by the search server 3000 triggers the file server 4000 to delete the entry of the corresponding search server 3000 from the used language cache management table 9900 in the integrated search server 2000.

First, the search server 3000 executes the indexing for the file server 4000 which is the search target (S701). If the search server 3000 accesses the file, the file server 4000 determines that the search server 3000 has executed the indexing process (S702).

The file server 4000 checks whether or not the identification information on the search server 3000 which has executed the indexing process exists in a column of the transmitting search server 4231 in the cache destination management table 4230 (S703). If the identification information does not exist in the column of the transmitting search server 4231 in the cache destination management table 4230, subsequent processes are not performed and the process is terminated.

On the other hand, if the identification information exists, the cache deletion request is transmitted to the cache destination-integrated search server 2000 in the entry (S704). This cache deletion request includes the identification information on the search server 3000 which is the transmitter.

The integrated search server 2000 receives the cache deletion request from the file server 4000 (S705), and deletes the entry of the transmitting search server 9100 described in the cache deletion request, from the used language cache management table 9900 (S706).

In this way, the update of the search index by the search server 3000 can trigger cached information such as the used language cache management table 9900 on the integrated search server 2000 to be released. Thereby, it is not necessary to continue to keep old information in the cache. It should be noted that, in this example, the file server 4000 issues the cache deletion request, while the search server 3000 which updates the search index may issue the request. In this case, the cache destination management table can be managed by the search server 3000.

<Cache Usage Form>

The cache may be used for each search keyword. In other words, in the second embodiment, in the method in which the digest information changes for each search keyword, the digest information cache management table 2280 may be created on the integrated search server 2000 for each search keyword, and when the integrated search result obtaining request arrives in which the same search keyword is designated again, the digest information cache management table 2280 corresponding to the keyword may be used to narrow down the search servers 3000 to which the search result obtaining request is transmitted.

Here, the number of search results in Method 1, the maximum value and the minimum value of the score of the document in the search result, and the number of search results in Method 2, the score of each document in the search result, the number of digest information target scores, and the number of search results in Method 3, as described above, and the like correspond to the digest information which changes depending on the search keyword.

When the method is used in which the digest information cache management table 2280 is created for each search keyword, if the search is performed by using the same search keyword, communication overheads required for a process for obtaining the digest information can be reduced.

(3) Conclusion

According to the present invention, the digest information which matches the search request from the search client PC, and which is for narrowing the plurality of search servers down to some of the search servers, is obtained from each search server, and this digest information is collated with previously defined rules (search server narrow-down policy), and thereby, the search servers from which the search results are actually obtained are limited. In this way, since only the search results required for creating the integrated search result are obtained from some of the search servers, the integrated search server does not need to communicate with all the search servers, and can reduce network band usage. Moreover, since the integrated search server temporarily saves only the search results required for creating the integrated search result, in the memory on the integrated search server, the memory usage can be reduced.

Furthermore, the integrated search server may temporarily cache the digest information obtained in the past, in the main storage device, and may utilize the digest information to obtain the next and subsequent search results. Thereby, the number of communications with each search server can be further reduced, which thus can further contribute to the reduction in the network band usage. In this case, if the index creation (update) process (indexing process) has been executed in any search server, the integrated search server deletes the cached digest information. Thereby, a situation in which the search results are obtained based on the digest information which does not reflect a current search index can be prevented from occurring.

It should be noted that the present invention can also be realized by a program code of software which realizes the functions of the embodiments. In this case, a system or an apparatus is provided with a storage medium in which the program code is recorded, and a computer (or a CPU or an MPU) of the system or the apparatus reads the program code stored in the storage medium. In this case, the program code itself read from the storage medium realizes the functions of the above described embodiments, and hence the program code itself and the storage medium in which the program code is stored constitute the present invention. As the storage medium for supplying such a program code, for example, a flexible disk, a CD-ROM, a DVDROM, a hard disk, an optical disk, a magnetic-optical disk, a CD-R, a magnetic tape, a nonvolatile memory card, a ROM or the like is used.

Moreover, the functions of the above described embodiments may be realized by causing an OS (operating system) or the like which operates on the computer, to perform a part or all of actual processes based on instructions of the program code. Furthermore, the functions of the above described embodiments may be realized by writing the program code read from the storage medium into a memory on the computer, and then causing a CPU or the like of the computer to perform a part or all of the actual processes based on the instructions of the program code.

Moreover, the program code of the software which realizes the functions of the embodiments may be stored in storage means such as a hard disk or a memory of the system or the apparatus, or in a storage medium such as a CD-RW or a CD-R, by delivering the program code via a network. When the program code is used, the computer (or the CPU or the MPU) of the system or the apparatus may read and execute the program code stored in the storage means or the storage medium.

REFERENCE SIGNS LIST

100 Network
1000, 1001 Search client PC
2000 Integrated search server
3000, 3001 Search server
4000, 4001 File server
1100, 2100, 3100, 4100 CPU
1200, 2200, 3200, 4200 Main storage device
1300, 2300, 3300, 4300 External storage device connection interface
1400, 2400, 3400, 4400 Network interface
1500, 2500, 3500, 4500 External storage device
1210 Search client program
2210 Integrated search result obtaining request acceptance program
2220 Digest information obtaining request transmission program
2230 Search server narrow-down program
2240 Search result obtaining request transmission program
2250 Integrated search result transmission program
2260 Digest information table
2270 Digest information cache management program
2280 Digest information cache management table
3210 Search result transmission program
3220 Search result digest information transmission program
3230 Cache destination registration request transmission program
4210 File sharing program
4220 Cache destination management table operation program
4230 Cache destination management table
4231 Transmitting search server
4232 Cache destination-integrated search server
5000, 6000, 8000, 9000, 9900, 10000 Digest information table
7000 Temporarily-saved digest information table
5100, 6100, 7100, 8100, 9100, 10100 Transmitting search server
5200, 6400, 7400, 8400 The number of search results
6200, 7200 Maximum score value
6300, 7300 Minimum score value
8200 Score
8300 The number of digest information target scores
9200 Used language
9300 Registration date and time
10200 Access right

The invention claimed is:

1. An integrated search server which is coupled with a plurality of search clients, a plurality of search servers, and a plurality of file servers, the integrated search server comprising:

a processor, and a main storage device, wherein the processor obtains digest information which is related to a search condition included in an integrated search result obtaining request received from one of the plurality of search clients, and which is for narrowing down search servers from which search results are obtained, from each of the plurality of search servers, and narrows down the search servers from which the search results are obtained, from the plurality of search servers, based on the obtained plural pieces of digest information and a predetermined search server narrow-down rule, wherein the processor further obtains the search results corresponding to the integrated search result obtaining request, from the search servers which have been narrowed down, integrates the search results, and provides the integrated search result to the search client, wherein each of the plural pieces of digest information is a score value of each document included in the search results provided based on the search condition by the plurality of search servers, wherein the processor compares the score values for the plurality of search servers, and thereby narrows down the search servers from which the search results are obtained, wherein the number of search results to be provided to the search client is set to k (an integer equal to or larger than 1), wherein each of the plural pieces of digest information is a maximum score value and a minimum score value of the documents included in the search results in each of the plurality of search servers, and wherein the processor selects search servers (candidate search servers) having the number of search results, in which a sum of the search results is equal to or larger than the k, in descending order of the maximum score value, selects search servers (supplementary search servers) in which the maximum score value is larger than the minimum score value which is the smallest in the candidate search servers, from search servers other than the selected candidate search servers, narrows the servers from which the search results are obtained, down to the candidate search servers and the supplementary search servers, and provides k search results with top score values, from the search results provided from the search servers which have been narrowed down, to the search client.

2. An integrated search method in an integrated search system having a search client, a plurality of search servers, a plurality of file servers, and an integrated search server, wherein the integrated search server receives an integrated search result obtaining request from the search client, and transmits a digest information obtaining request for requesting digest information, to each of the plurality of search servers, each of the plurality of search servers receives the digest information obtaining request, and transmits the digest information which is related to a search condition included in the integrated search result obtaining request, and which is for narrowing down search servers from which search results are obtained, to the integrated search server, the integrated search server obtains the digest information from each of the plurality of search servers, narrows down the search servers from which the search results are obtained, from the plurality of search servers, based on the obtained plural pieces of digest information and a predetermined search server narrow-down rule, and transmits a search result obtaining request including the search condition to the search servers which have been narrowed down, the search servers which have been narrowed down transmit the search results to the integrated search server in response to the search result obtaining request, the integrated search server integrates the search results obtained from each of the search servers which have been narrowed down, and provides the integrated search result to the search client, wherein the number of search results to be provided to the search client is set to k (an integer equal to or larger than 1), wherein the digest information is configured to have one of information on a score value of each document included in the search results provided based on the search condition by the plurality of search servers, information on a language used in index information in each of the search servers, and information regarding an access right of the search client to each of the plurality of search servers, or to have information including a combination of a plurality thereof, wherein depending on the digest information, the integrated search server narrows the search servers from which the search results are obtained, down to search servers matching one condition or a combination of conditions, in search servers which provide top k score values, search servers including all languages used in a search keyword included in the search condition, and search servers to which the access right is included in the search client, wherein each of the plural pieces of digest information is a maximum score value and a minimum score value of the documents included in the search results in each of the plurality of search servers, and wherein the processor selects search servers (candidate search servers) having the number of search results, in which a sum of the search results is equal to or larger than the k, in descending order of the maximum score value, selects search servers (supplementary search servers) in which the maximum score value is larger than the minimum score value which is the smallest in the candidate search servers, from search servers other than the selected candidate search servers, narrows the servers from which the search results are obtained, down to the candidate search servers and the supplementary search servers, and provides k search results with top score values, from the search results provided from the search servers which have been narrowed down, to the search client.

3. The integrated search server according to claim 1, wherein each of the plural pieces of the digest information is information on the number of search results which are obtained by executing a search in a search index by using the search condition by the plurality of search servers, the processor receives a plurality of the integrated search result obtaining requests from the plurality of search clients, and generates a plurality of digest information obtaining requests for obtaining the digest information corresponding to the plurality of integrated search result obtaining requests, from respective search conditions included in the plurality of integrated search result obtaining requests, and the processor transmits the respective plurality of digest information obtaining requests to the respective plurality of search servers, receives a plurality of pieces of the digest information transmitted from the respective plurality of search servers in response to the plurality of digest information obtaining requests, uses each of the received plurality of pieces of the digest information to select each of a plurality of search server groups having the number of search results which is equal to or larger than a predetermined number, transmits search result obtaining requests corresponding to the plurality of integrated search result obtaining requests, to the respective selected plurality of search server groups, obtains a plurality of the search results from the respective selected plurality of search server groups, integrates the search results, and provides the integrated search results to the respective plurality of search clients.

4. The integrated search server according to claim 1, wherein the number of search results to be provided to the search client is set to k (an integer equal to or larger than 1), the number of top score values to be used as the digest information is defined in advance for each of the plurality of search servers, and the processor sorts the score values obtained from each of the plurality of search servers in descending order, narrows the search servers from which the search results are obtained, down to all search servers including a predetermined number of top score values, and provides the predetermined number of the search results to the search client.

5. The integrated search server according to claim 1, wherein each of the plural pieces of digest information is information on a language used in index information in each of the search servers, and the processor collates a language used in a search keyword included in the search condition with the index information, and narrows the search servers from which the search results are obtained, down to search servers including all the languages used in the keyword.

6. The integrated search server according to claim 1, wherein each of the plural pieces of digest information is information regarding an access right of the search client to each of the plurality of search servers, and the processor collates access right information on the search client which is included in the search condition, with the digest information, and narrows the search servers from which the search results are obtained, down to search servers to which the access right exists.

7. The integrated search server according to claim 1, wherein the processor temporarily stores the plural pieces of digest information in the main storage device, and uses the plural pieces of digest information to obtain search results corresponding to next and subsequent search requests including the same condition as the search condition, and after at least one of the plurality of search servers has performed an index creation process for the file server which is associated therewith, the processor deletes the plural pieces of stored digest information.

8. The integrated search method according to claim 2, wherein the integrated search server temporarily stores the digest information in a main storage device, and uses the digest information to obtain search results corresponding to next and subsequent search requests including the same condition as the search condition, and if the plural pieces of digest information have been temporarily stored in the main storage device in the integrated search server, the file server manages a storage location of the digest information, and identification information on the search server which has transmitted the digest information.

9. The integrated search method according to claim 8, wherein at least one of the plurality of search servers executes an index creation process for the file server which is associated with the search server, if a search index has been rewritten by the index creation process, the file server transmits a cache deletion request for deleting the temporarily stored digest information from the main storage device, to the integrated search server, and in response to the cache deletion request, the integrated search server deletes the temporarily stored digest information from the main storage device.

* * * * *